United States Patent
Starsinic et al.

(10) Patent No.: US 12,177,215 B2
(45) Date of Patent: *Dec. 24, 2024

(54) MACHINE-TO-MACHINE NETWORK ASSISTED BOOTSTRAPPING

(71) Applicant: InterDigital Patent Holdings, Inc., Wilmington, DE (US)

(72) Inventors: Michael F. Starsinic, Newtown, PA (US); Guang Lu, Thornhill (CA); Suresh Palanisamy, Tamilnadu (IN); Qing Li, Princeton Junction, NJ (US); Dale N. Seed, Allentown, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,046

(22) Filed: Apr. 26, 2023

(65) Prior Publication Data
US 2023/0262062 A1  Aug. 17, 2023

Related U.S. Application Data

(63) Continuation of application No. 16/425,126, filed on May 29, 2019, now Pat. No. 11,677,748, which is a
(Continued)

(51) Int. Cl.
*H04L 9/40* (2022.01)
*H04L 61/4511* (2022.01)
(Continued)

(52) U.S. Cl.
CPC ...... *H04L 63/0876* (2013.01); *H04L 61/4511* (2022.05); *H04L 61/5007* (2022.05);
(Continued)

(58) Field of Classification Search
None
See application file for complete search history.

(56) References Cited

U.S. PATENT DOCUMENTS 7,469,294 B1    12/2008  Luo et al.
7,831,835 B2    11/2010  Zhang et al.
(Continued)

FOREIGN PATENT DOCUMENTS

CN    1848994 A    10/2006
CN    1299537 C    2/2007
(Continued)

OTHER PUBLICATIONS

Wang et al., "A Dynamic Periodic Distributing Scheme for Authentication Data Based on EAP-AKA in Heterogeneous Interworking Networks", (2009 IEEE 70th Vehicular technology Conference Fall, Dec. 31, 2009, pp. 1-8.
(Continued)

*Primary Examiner* — Kaveh Abrishamkar
(74) *Attorney, Agent, or Firm* — Flaster Greenberg P.C.

(57) ABSTRACT

The service layer may leverage the access network infrastructure so that applications on a device may bootstrap with a machine-to-machine server without requiring provisioning beyond what is already required by the access network.

19 Claims, 12 Drawing Sheets

Related U.S. Application Data continuation of application No. 15/920,595, filed on Mar. 14, 2018, now Pat. No. 10,348,728, which is a continuation of application No. 15/476,022, filed on Mar. 31, 2017, now Pat. No. 9,923,895, which is a continuation of application No. 15/135,100, filed on Apr. 21, 2016, now Pat. No. 9,614,846, which is a continuation of application No. 14/285,397, filed on May 22, 2014, now Pat. No. 9,344,888.

(60) Provisional application No. 61/826,176, filed on May 22, 2013.

(51) Int. Cl.
*H04L 61/5007* (2022.01)
*H04L 67/00* (2022.01)
*H04W 4/70* (2018.01)
*H04W 12/04* (2021.01)
*H04W 12/0431* (2021.01)
*H04W 12/06* (2021.01)

(52) U.S. Cl.
CPC ........ *H04L 63/0428* (2013.01); *H04L 63/061* (2013.01); *H04L 63/083* (2013.01); *H04L 63/164* (2013.01); *H04L 67/34* (2013.01); *H04W 4/70* (2018.02); *H04W 12/04* (2013.01); *H04W 12/0431* (2021.01); *H04W 12/06* (2013.01)

(56) References Cited

U.S. PATENT DOCUMENTS

| | | | | |
|---|---|---|---|---|
| 8,006,089 | B2* | 8/2011 | Ohba | H04W 12/0602 |
| | | | | 713/168 |
| 8,782,434 | B1* | 7/2014 | Ghose | G06F 9/3851 |
| | | | | 713/190 |
| 8,782,435 | B1* | 7/2014 | Ghose | G06F 9/3851 |
| | | | | 713/190 |
| 9,202,055 | B2 | 12/2015 | Yegin et al. | |
| 9,246,690 | B1* | 1/2016 | Roth | H04L 9/3268 |
| 9,258,705 | B2 | 2/2016 | Kang et al. | |
| 9,317,688 | B2 | 4/2016 | Yegin et al. | |
| 9,344,888 | B2* | 5/2016 | Starsinic | H04W 4/70 |
| 9,392,459 | B2 | 7/2016 | Starsinic et al. | |
| 9,450,928 | B2 | 9/2016 | Broustis et al. | |
| 9,614,846 | B2* | 4/2017 | Starsinic | H04W 4/70 |
| 9,923,895 | B2* | 3/2018 | Starsinic | H04W 4/70 |
| 11,677,748 | B2* | 6/2023 | Starsinic | H04L 63/0428 |
| | | | | 713/171 |
| 2003/0212800 | A1* | 11/2003 | Jones | H04W 12/0808 |
| | | | | 709/228 |
| 2004/0054794 | A1* | 3/2004 | Lantto | H04W 12/06 |
| | | | | 709/229 |
| 2004/0181692 | A1* | 9/2004 | Wild | H04W 12/0609 |
| | | | | 726/4 |
| 2005/0059396 | A1 | 3/2005 | Chuah et al. | |
| 2005/0096048 | A1 | 5/2005 | Clare et al. | |
| 2005/0278499 | A1* | 12/2005 | Durham | G06F 21/64 |
| | | | | 711/173 |
| 2006/0185013 | A1* | 8/2006 | Oyama | H04L 63/08 |
| | | | | 726/21 |
| 2007/0022476 | A1 | 1/2007 | Bae et al. | |
| 2007/0118744 | A1 | 5/2007 | Huang | |
| 2007/0124587 | A1 | 5/2007 | Krishnamurthi et al. | |
| 2008/0016230 | A1 | 1/2008 | Holtmanns et al. | |
| 2008/0072057 | A1 | 3/2008 | Zhang et al. | |
| 2008/0141031 | A1 | 6/2008 | Oba et al. | |
| 2008/0175237 | A1 | 7/2008 | Kim | |
| 2008/0178266 | A1 | 7/2008 | Touray et al. | |
| 2008/0178269 | A1 | 7/2008 | Kim et al. | |
| 2008/0274725 | A1 | 11/2008 | Tkachenko | |
| 2011/0004747 | A1 | 1/2011 | Venkatachalam | |
| 2011/0188508 | A1 | 8/2011 | Hjelm et al. | |
| 2011/0271117 | A1 | 11/2011 | Qiang | |
| 2011/0307694 | A1 | 12/2011 | Broustis et al. | |
| 2012/0204182 | A1* | 8/2012 | Doteguchi | G06F 11/3672 |
| | | | | 718/102 |
| 2012/0204231 | A1 | 8/2012 | Holtmanns et al. | |
| 2012/0254959 | A1 | 10/2012 | Schmidt et al. | |
| 2012/0265979 | A1 | 10/2012 | Yegin et al. | |
| 2012/0265983 | A1 | 10/2012 | Yegin et al. | |
| 2012/0266223 | A1 | 10/2012 | Yegin et al. | |
| 2012/0284785 | A1 | 11/2012 | Salkintzis et al. | |
| 2013/0003972 | A1 | 1/2013 | Kang et al. | |
| 2013/0102308 | A1 | 4/2013 | Patil et al. | |
| 2013/0124685 | A1 | 5/2013 | Keitel et al. | |
| 2014/0020070 | A1 | 1/2014 | Angal | |
| 2014/0052984 | A1 | 2/2014 | Gupta | |
| 2014/0093071 | A1 | 4/2014 | Qiang | |
| 2014/0286237 | A1 | 9/2014 | Bhalla | |
| 2014/0349614 | A1 | 11/2014 | Starsinic et al. | |
| 2014/0351592 | A1 | 11/2014 | Starsinic et al. | |
| 2015/0230063 | A1 | 8/2015 | Chandramouli et al. | |

FOREIGN PATENT DOCUMENTS

| | | |
|---|---|---|
| CN | 101272297 A | 9/2008 |
| CN | 101426190 A | 5/2009 |
| CN | 101455053 A | 6/2009 |
| EP | 1713204 A1 | 10/2006 |
| EP | 2219339 A1 | 8/2010 |
| JP | 2007-535047 A | 11/2007 |
| JP | 2012-505436 | 3/2012 |
| WO | 2007/034299 A1 | 3/2007 |
| WO | 2012/077999 A2 | 6/2012 |
| WO | 2012/094879 A1 | 7/2012 |
| WO | 2012/103954 A1 | 8/2012 |
| WO | 2013/064509 A1 | 5/2013 |
| WO | 2014/190177 A1 | 11/2014 |
| WO | 2014/190186 A1 | 11/2014 |

OTHER PUBLICATIONS

U.S. Appl. No. 16/425,126, filed May 28, 2019.
U.S. Appl. No. 15/920,595, filed Mar. 13, 2018.
U.S. Appl. No. 15/476,022, filed Mar. 30, 2017.
U.S. Appl. No. 15/135,100, filed Apr. 20, 2016.
U.S. Appl. No. 14/285,397, filed May 21, 2014.
3GPP TS 29.329, Sh interface based on the Diameter protocol, Protocol details, Release 5, May 2002, pp. 1-12.
3rd Generation Partnership Project; (3GPP) TR 23.887, V0.6.0 Technical Specification Group Services and System Aspects; Machine-Type and other Mobile Data Applications Communications Enhancements, (Release 12) Dec. 2012, 95 pages.
3rd Generation Partnership Project; (3GPP) TS 22.368 v12.2.0, 3rd Generation Partnership Project; Technical Specification Group Services and System Aspects; Service Requirements for Machine Type Communications (MTC); Stage 1 (Release 12), Mar. 2013.
3rd Generation Partnership Project; (3GPP) TS 23.008 v11.7.0, 3rd Generation Partnership Project; Technical Specification Group Core Network and Terminals; Organization of Subscriber Data, (Release 11), Mar. 2013, 110 pages.
3rd Generation Partnership Project; (3GPP) TS 23.040 V11.5.0, 3rd Generation Partnership Project; Technical Specification Group Core Network and Terminals; Technical Realization of Short Message Service (SMS), (Release 11), Mar. 2013, 206 pages.
3rd Generation Partnership Project; (3GPP) TS 23.060 v12.0.0, 3rd Generation Partnership Project; Technical Specification Group Services and System Aspects; General Packet Radio Service (GPRS), Service Description; Stage 2, (Release 12), Mar. 2013, 228 pages.
3rd Generation Partnership Project; (3GPP) TS 23.401 v12.0.0, 3rd Generation Partnership Project; Technical Specification Group Services and System Aspects; General Packet Radio Service (GPRS) Enhancements for Evolved Universal Terrestrial Radio Access Network (E-UTRAN) access, (Release 12), Mar. 2013, 290 pages.
3rd Generation Partnership Project; (3GPP) TS 23.682 v11.3.0, 3rd Generation Partnership Project; Technical Specification Group Ser-

(56) References Cited

OTHER PUBLICATIONS vices and System Aspects; Architecture Enhancements to Facilitate Communications with Packet Data Networks and Applications, (Release 11), Dec. 2012, 29 pages.
3rd Generation Partnership Project; (3GPP) TS 24.008 v10.10.0, 3rd Generation Partnership Project; Technical Specification Group Core Network and Terminals; Mobile Radio Interface Layer 3 Specification; Core Network Protocols; Stage 3 (Release 10), Mar. 2013.
3rd Generation Partnership Project; (3GPP) TS 24.301 v11.6.0, 3rd Generation Partnership Project; Technical Specification Group Core Network and Terminals; Non-access-stratum (NAS) protocol for Evolved Pack System (EPS); Stage 3, (Release 11), Mar. 2013, 312 pages.
3rd Generation Partnership Project; (3GPP) TS 29.002 v11.6.0, Technical Specification Group Core Network and Terminals; Mobile Application Part (MAP) Specification (Release 11), Mar. 2013, 1013 pages.
3rd Generation Partnership Project; (3GPP) TS 29.109 v11.3.0, 3rd Generation Partnership Project; Technical Specification Group Core Network and Terminals; Generic Authentication Architecture (GAA); Zn and Zh Interfaces Based on the Diameter Protocol; Stage 3 (Release 11), Mar. 2013, 69 pages.
3rd Generation Partnership Project; (3GPP) TS 29.329 v12.0.0, 3rd Generation Partnership Project; Technical Specification Group Core Network and Terminals; Sh interface based on the Diameter protocol; Protocol details (Release 12), Mar. 2013, 22 pages.
3rd Generation Partnership Project; (3GPP) TS 29.329, V11.5.0, 3rd Generation Partnership Project; Technical Specification Group Core Network and Terminals; Sh Interface Based on the Diameter Protocol; Protocol details (Release 11), Dec. 2012, 22 pages.
3rd Generation Partnership Project; (3GPP) TS 29.336 v11.1.0, 3rd Generation Partnership Project; Technical Specification Group Core Network and Terminals; Home Subscriber Server (HSS) Diameter Interfaces for Interworking with Packet Data Networks and Applications (Release 11), Dec. 2012, 21 pages.
3rd Generation Partnership Project; (3GPP) TS 29.337 v11.2.0, 3rd Generation Partnership Project; Technical Specification Group Core Network and Terminals; Diameter-based T4 Interface for Communications With Packet Data Networks and Applications (Release 11), Mar. 2013, 18 pages.
3rd Generation Partnership Project; (3GPP) TS 29.368, Tsp interface protocol between the MTC Interworking Function (MTC-IWF) and Service Capability Server (SCS), Dec. 2012.
3rd Generation Partnership Project; (3GPP) TS 33.210 v12.2.0, 3rd Generation Partnership Project; Technical Specification Group Services and System Aspects; 3G security; Network Domain Security (NDS); IP network layer security (Release 12), Dec. 2012, 24 pages.
3rd Generation Partnership Project; (3GPP) TS 33.220 v11.4.0, 3rd Generation Partnership Project; Technical Specification Group Services and System Aspects; Generic Authentication Architecture (GAA); Generic Bootstrapping Architecture (GBA), (Release 11), Sep. 2012, 92 pages.
3rd Generation Partnership Project; (3GPP) TS 33.220 V12.0.0, 3rd Generation Partnership Project; Technical Specification Group Services and System Aspects; Generic Authenitication Architecture (GAA); Generic Bootstrapping Architecture (GBA) (Release 12) Mar. 2013, 20 pages.
3rd Generation Partnership Project; (3GPP) TS 33.310 v11.2.0, 3rd Generation Partnership Project; Technical Specification Group Services and System Aspects; Network Domain Security (NDS); Authentication Framework (AF) (Release 11), Dec. 2012, 54 pages.
3rd Generation Partnership Project; (3GPP) TS 33.402, V11.4.0, Technical Specification Group Services and System Aspects; 3GPP System Architecture Evolution (SAE); Security Aspects of non-3GPP accesses, (Release 11), Jun. 2012.
3rd Generation Partnership Project; (3GPP) TS 33.922 V1.0.0, 3rd Generation Partnership Project; Technical Specification Group Services and System Aspects; Security aspects for inter-access mobility between non 3GPP and 3GPP access network, (Release 8), Sep. 30, 2008, pp. 1-30.
3rd Generation Partnership Project; (3GPP), TR 21.905, v11.3.0, 3rd Generation Partnership Project; Technical Specification Group Services and System Aspects; Vocabulary for 3GPP Specifications, (Release 11), Dec. 2012, 64 pages.
3rd Generation Partnership Project; (3GPP), TS 23.003 v11.4.0, 3rd Generation Partnership Project; Technical Specification Group Core Network and Terminals; Numbering addressing and identification, (Release 11), Dec. 2012, 83 pages.
3rd Generation Partnership Project; (3GPP); TS 22.011 v12.0.0, 3rd Generation Partnership Project; Technical Specification Group Services and System Aspects; Service accessibility, (Release 12), Mar. 2013, 26 pages.
Aboba Microsoft L Blunk Merit Network B et al: "Extensible Authentication Protocol (EAP); rfc3748.txt", Jun. 1, 2004, Jun. 1, 2004 (Jun. 1, 2004), XP015009528.
Adoba et al, "Extensible Authentication Protocol (EAP)", RFC 3748, Jun. 1, 2004.
Arkko et al, "Improved Extensible Authentication Protocol Method for 3rd Generation Authentication and Key Agreement (EAP-AKA)", The Internet Engineering Task Force (IETF), RFC 5488, May 2009, 29 pages.
Arkko, J. and Haverinen, N., "Extensible Authentication Protocol Method for 3rd Generation Authentication and Key Agreement (EAP-AKA)", The Internet Engineering Task Force (IETF), RFC 4187, Jan. 2006.
Calhoun et al, "Diameter Base Protocol", The Internet Engineering Task Force (IETF) RFC 3588, Sep. 2003, 138 pages.
Crocker D. and Overell, P., "Augmented BNF for Syntax Specifications: ABNF", The Internet Engineering Task Force (IETF) RFC 2234, Nov. 1997, 14 pages.
Dierks, T. and Rescorla, E., "Transport Layer Security (TLS) Protocol Version 1.1" The Internet Engineering Task Force (IETF), RFC 4346, Apr. 2006, 82 pages.
Ericsson, Enhanced privacy support in GAA/GBA[online], 3GPP TGS-SA WG341 S3-050753 <URL:http://www.3gpp.org/ftp/tsg_sa/WG3_Security/TSGS#_41_SanDiego/Docs/S3-050753.zip>.
Ericsson, Nokia Corporation, Nokia Siemens Networks, Alligment of TS33.402 to draft-arkko-eap-aka-kdf[online], 3GPP Tsg-Sa WG3#53 S3-081361, <URL:http://www.3gpp.org/ftp/tsg_sa/WG3_Security/TSGS3_53_Kyoto/Docs/S3-081361.zip>.
European Telecommunications Standards Institute (ETSI), TS 102 690 v1.1.1, Machine-to-Machine Communications (M2M); Functional Architecture, Oct. 2011.
European Telecommunications Standards Institute (ETSI), TS 102 921 v1.1.1, Machine-to-Machine Communications (M2M); mIa, dIa and mId Interfaces, Feb. 2012, 250 pages.
Forsberg, et al, "Protocol for Carrying Authentication for Network Access (PANA)", The Internet Engineering Task Force (IETF), RFC 5191, May 2008, 46 pages.
Franks et al, "HTTP Authentication: Basic and Digest Authentication", The Internet Engineering Task Force (IETF), RFC 2617, Jun. 1999, 32 pages.
Hakala et al, "Diameter Credit-Control Application", RFC 4006, Aug. 2005, 107 pages.
International Patent Application No. PCT/US14/39205: International Preliminary Report on Patentability dated May 20, 2015, 16 pages.
International Patent Application No. PCT/US2014/039188: International Search Report and Written Opinion dated Sep. 26, 2014, 9 pages.
International Patent Application No. PCT/US2014/039205: International Search Report and Written Opinion dated Sep. 26, 2014, 11 pages.
Japanese Application No. 2016-515095: Notice of Reasons for Rejection dated Nov. 28, 2016, 5 pages.
Japanese Patent Application No. 2016-515092: Notice of Reasons for Rejection dated Dec. 16, 2016, 9 pages.
Niemi et al, "Hypertext Transfer Protocol (HTTP) Digest Authentication Using Authentication and Key Agreement (AKA)", RFC 3310, Sep. 2002, 17 pages.

(56) References Cited

OTHER PUBLICATIONS

Romascanu and Tschofenig, H., "Updated IANA Considerations for Diameter Command Code Allocations", The Internet Engineering Task Force (IETF), RFC 5719, Jan. 2010, 5 pages.
Shi et al., "Improvement on 3G/WLAN Interactive Network-based Authentication Method", Information Network Security, No. 8, Aug. 10, 2008, pp. 43-45.
U.S. Appl. filed May 22, 2014, Starsinic., U.S. Appl. No. 14/285,180.
US. Appl. filed May 22, 2014, Starsinic., U.S. Appl. No. 14/285,397.
3rd Generation Partnership Project; "Technical Specification Group Core Network and Terminals; Home Subscriber Server (HSS) diameter interfaces for interworking with packet data networks and applications; (Release 12)", 3GPP TS 29.336 V12.1.0, Sep. 2013, 22 pages.

* cited by examiner

MACHINE-TO-MACHINE NETWORK ASSISTED BOOTSTRAPPING

CROSS-REFERENCE TO RELATED APPLICATIONS

This application is a continuation of U.S. patent application Ser. No. 16/425,126, filed May 29, 2019, which is a continuation of U.S. patent application Ser. No. 15/476,022, filed Mar. 31, 2017, which is a continuation of U.S. patent application Ser. No. 15/135,100, filed Apr. 21, 2016, which is a continuation of Ser. No. 14/285,397, filed May 22, 2014, each of which are entitled "MACHINE-TO-MACHINE NETWORK ASSISTED BOOTSTRAPPING," which claims the benefit of U.S. Provisional Patent Application No. 61/826,176, filed on May 22, 2013, entitled "ACCESS NETWORK ASSISTED BOOTSTRAPPING." The contents of U.S. patent application Ser. Nos. 15/920,595, 15/476,022, 15/135,100, 14/285,397, and 61/826,176 are hereby incorporated by reference herein in their entirety.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate with each other over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold.

Several efforts have been undertaken to develop standardized architectures for machine-to-machine communication. These include 3rd Generation Partnership Project (3GPP) Machine Type Communication (MTC) architecture, the ETSI M2M architecture, and the oneM2M architecture. These architectures are summarized briefly below.

The 3GPP evolved packet core (EPC) network was not originally designed in a way that is optimized for handling machine-to-machine (M2M) communications, also referred to as machine type communications (MTC), in which machines, or devices, communicate with each other over the network, such as communications involving smart metering, home automation, eHealth, consumer products, fleet management, etc. Thus, in Release 11 (R11) of the 3GPP specifications, 3GPP enhanced the interworking capabilities of the UMTS core network for machine type communications/machine-to-machine communications. Interworking refers to a server, or application, interfacing to the core network for the purposes of exchanging information, controlling devices, or monitoring devices, or communicating with devices. FIG. 1 shows portions of the MTC architecture that is presented by 3GPP in TS 23.682 V11.5.0.

As shown in FIG. 1, user equipment 314 may connect to the EPC over radio access network (RAN) 319, which may comprise E-UTRAN (LTE access network). The Evolved NodeB (eNodeB) 3 is the base station for LTE radio. In this figure, the EPC comprises a number of network elements, including Serving Gateway (Serving GW) 310, Packet Data Network Gateway (PDN GW or P-GW) 353, mobility management entity (MME) 312 and Home Subscriber Server (HSS) 357.

HSS 357 is a database that contains user-related and subscriber-related information. It also provides support functions in mobility management, call and session setup, user authentication and access authorization.

The gateways (S-GW 310 and P-GW 352) deal with the user plane. They transport IP data traffic between the User Equipment (UE) 314 and an external network(s). S-GW 310 is the point of interconnect between the radio-side and the EPC. As its name indicates, this gateway serves the UE by routing incoming and outgoing IP packets. It is the anchor point for intra-LTE mobility (i.e., in case of handover between eNodeBs in the RAN 319) and between LTE and other 3GPP accesses. It is logically connected to the other gateway, the P-GW 353.

The P-GW 353 is the point of interconnect between the EPC and external IP networks, such as the Internet. These networks are called PDNs (Packet Data Networks), hence the name. The P-GW 353 routes packets to and from the PDNs. The P-GW 353 also performs various functions such as IP address/IP prefix allocation or policy control and charging. 3GPP specifies these gateways operate independently but in practice they may be combined in a single "box" by network vendors.

The MME 312 deals with the control plane. It handles the signaling related to mobility and security for E-UTRAN access. The MME is responsible for the tracking and the paging of UEs in idle-mode. It is also the termination point of the Non-Access Stratum (NAS).

As mentioned above, a UE 314 can reach the EPC using E-UTRAN, however this is not the only access technology supported. 3GPP specifies support of multiple access technologies and also the handover between these accesses. The idea is to bring convergence using a unique core network providing various IP-based services over multiple access technologies. Existing 3GPP radio access networks are supported. 3GPP specifications define how interworking is achieved between an E-UTRAN (LTE and LTE-Advanced), GERAN (radio access network of GSM/GPRS) and UTRAN (radio access network of UMTS-based technologies WCDMA and HSPA).

The architecture also allows non-3GPP technologies to interconnect the UE and the EPC. Non-3GPP means that these accesses were not specified in 3GPP. These technologies include, for example, WiMAX, cdma2000®, WLAN or fixed networks. Non-3GPP accesses can be split into two categories: the "trusted" ones and the "untrusted". Trusted non-3GPP accesses can interact directly with the EPC. Untrusted non-3GPP accesses interwork with the EPC via a network entity called the ePDG (for Evolved Packet Data Gateway) (not shown). The main role of the ePDG is to provide security mechanisms such as IPsec tunneling of connections with the UE over an untrusted non-3GPP access. 3GPP does not specify which non-3GPP technologies should be considered trusted or untrusted. This decision is made by the operator.

As further illustrated in FIG. 1, service capability server (SCS) 361 may provide services to the core network, devices, and applications. The SCS may also be called an M2M Server, MTC Server, a Service Capability Layer (SCL), or a Common Services Entity (CSE). SCS 361 may be controlled by the operator of the home public land mobile network (HPLMN) or by an MTC service provider. An SCS may be deployed inside or outside the operator domain. If an SCS is deployed inside the operator domain, the SCS may be an internal network function and may be controlled by the operator. If an SCS is deployed outside the operator domain, the SCS may be controlled by a MTC service provider.

In the MTC architecture of FIG. 1, SCS 361 may communicate with a machine type communication (MTC) interworking function (MTC-IWF) 359 via a Tsp reference point (i.e., interface) 308. The Tsp reference point is an example of an interface that is used for interworking with the core network.

A UE may communicate through the public land mobile network (PLMN), which includes radio access network (RAN) 319, with SCS(s) and/or other MTC UE(s). An MTC UE 214 may host one or more MTC applications 316. The MTC applications may also be hosted on one or more application servers (AS) (e.g., AS 320). The MTC application 316 may be a MTC communication endpoint that may interact with SCS 361, AS MTC applications, or other UE MTC applications.

An application server (AS) (e.g. AS 320) may also host one or more MTC applications. The AS 320 may interface with the SCS 161, and the SCS 361 may provide services to an application(s) running on the AS 320. The MTC applications on an AS may interact with SCSs, UE MTC applications, or other MTC applications.

The MTC inter working function (MTC-IWF) 359 hides the internal PLMN topology from the SCS 361. The MTC-IWF may relay and/or translate signaling protocols used between itself and the SCS (e.g., over the Tsp reference point 308) to support MTC functionality (e.g., MTC UE triggering) in the PLMN. For example, the SCS may request that the MTC-IWF send a trigger to a MTC device. The MTC-IWF may deliver the MTC trigger to the MTC device 314 via SMS (not shown), for example. The MTC device 316, based on the trigger, may respond to the SCS 312. The MTC device 314 may, for example, respond with a sensor reading. When the MTC device 214 responds to the SCS 312, the MTC device may use a packet data network (PDN)/packet data protocol (PDP) connection, via P-GW 353, to communicate with the SCS 361. The MTC device may connect with the SCS using an IP connection.

The MTC-IWF 359 may authorize the SCS 361, before the SCS may establish communication with the 3GPP network. For example, when the SCS 359 makes a trigger request on the Tsp reference point, the MTC-IWF 359 may check whether the SCS is authorized to send the trigger request and that the SCS has not exceeded its quota or rate of trigger submissions.

The ETSI M2M architecture is illustrated in FIG. 2. In the ETSI M2M architecture, a service capability layer (SCL) uses core network functionalities through a set of exposed interfaces to provide service capabilities to the network. An SCL may interface to one or several different core networks.

In the ETSI M2M architecture, the network comprises M2M devices (e.g., device 145), M2M gateways (e.g., gateway 140), and M2M servers (e.g., M2M server 125). A device application (DA) may be executing on an M2M device, a gateway application (GA) may be executing on an M2M gateway, and a network application (NA) may be executing on an M2M server. As further shown, a device (e.g. device 145) may implement M2M service capabilities using a device service capabilities layer (DSCL) (e.g., DSCL 146), a gateway may implement a gateway SCL (GSCL 141), and a server may implement a network SCL (NSCL) (e.g., NSCL 126).

The mIa reference point allows a network application to access the M2M service capabilities in an M2M server.

The dIa reference point allows a device application residing in an M2M device to access the different M2M service capabilities in the same M2M device or in an M2M gateway; and allows a gateway application residing in an M2M gateway to access the different M2M service capabilities in the same M2M gateway.

The mId reference point allows M2M service capabilities layer residing in an M2M device or M2M gateway to communicate with the M2M service capabilities layer in the network. The mId reference point uses core network connectivity functions as an underlying layer.

Further according to the ETSI M2M architecture, an M2M entity (e.g., an M2M functional entity such as a device, gateway, or server/platform that may be implemented by a combination of hardware and/or software) may provide an application or service. For example, a light sensor may provide data indicating detected light levels or a thermostat may provide temperature data and the ability to adjust air conditioning controls. This data may be made available as a "resource" that may be accessed by other M2M entities and that essentially serves as a means to exchange data between M2M entities. A resource may be a uniquely addressable representation of data that may be addressed using a Universal Resource Indicator (URI) or Universal Resource Locator (URL). The availability of such resources may be communicated among M2M entities via the M2M service capabilities layer (SCL).

The M2M SCL is also a functional entity that may be implemented using a combination of hardware and software and provides functions exposed on the reference points (i.e., functional interfaces between M2M entities) mentioned above. For example, the M2M SCL may provide common (service) functionalities that are shared or commonly used by different M2M applications and/or services. M2M service capabilities may use functions and capabilities of the 3GPP core network architecture through a set of exposed interfaces (e.g., existing interfaces specified by 3GPP, 3GPP2, ETSI TISPAN, etc.) and may also interface to one or more other core networks. M2M devices and entities are typically organized into M2M network domains. In many implementations, an M2M server (e.g., M2M server 125) configured with a network SCL entity (NSCL) may maintain resources and resource data for use by other devices (e.g., other M2M devices and M2M gateways) in the same M2M network domain.

Still referring to FIG. 2, NSCL 126 may be in network domain 122 and configured with network application (NA) 127 at M2M server platform 125. NA 127 and NSCL 126 may communicate via reference point mIa 128. The mIa reference points may allow an NA to access the M2M service capabilities available from an NSCL in an M2M domain. Also within network domain 122 may be GSCL 141 and gateway application (GA) 142 that may be configured at M2M gateway device 140. GSCL 141 and GA 142 may communicate using reference point dIa 143. Also within network domain 122 may be DSCL 146 and device application (DA) 147 that may be configured at M2M device 145. DSCL 146 and DA 147 may communicate using reference point dIa 148. Each of GSCL 141 and DSCL 146 may communicate with NSCL 126 using reference point mId 124. In general, dIa reference points allow device and gateway applications to communicate with their respective local service capabilities (i.e., service capabilities available at a DSCL and a GSCL, respectively). The mId reference point allows an M2M SCL residing in an M2M device (e.g., DSCL 146) or an M2M gateway (e.g., GSCL 141) to communicate with the M2M service capabilities in the network domain and vice versa (e.g., NSCL 126).

Typically, the device 145, gateway 140, and M2M server platform 125 comprise computing devices, such as the devices illustrated in FIG. 8C and FIG. 8D and described below. The NSCL, DSCL, GSCL, NA, GA, and DA entities typically are logical entities that are implemented in the form of software, executing on the underlying device or platform, to perform their respective functions in the system 120. The M2M server 125 of the ETSI M2M architecture may be an SCS (e.g., SCS 361 of FIG. 1) in the 3GPP MTC architecture.

As further shown in FIG. 2, NSCL 131 may be in domain 130 with NA 132. NA 132 and NSCL 131 may communicate via mIa reference point 133. There may be an NSCL 136 in network domain 135, and NSCL 139 in network domain 138. mIm reference point 123 may be an inter-domain reference point that allows M2M network nodes in different network domains, such as NSCL 126 in network domain 122, NSCL 131 in network domain 130, NSCL 136 in network domain 135, or NSCL 139 in network domain 138, to communicate with one another. For simplicity herein, the term "M2M server" may be used to indicate a service capability server (SCS), NSCL, application server, NA, or an MTC server. In addition, the term user equipment (UE), as discussed herein, may apply to GA, GSCL, DA, or DSCL. A UE may comprise any wireless device capable of communicating in a 3GPP or other wireless network, such as an M2M or MTC device or gateway, and including for example, machines, sensors, appliances, or the like, a mobile station, a fixed or mobile subscriber unit, a pager, a personal digital assistant (PDA), a computer, a mobile phone or smart phone, or any other type of device capable of operating in a wired or wireless environment.

While the 3GPP MTC and ETSI M2M architectures are described by way of background herein and may be used to illustrate various embodiments described hereinafter, it is understood that implementations of the embodiments described hereinafter may vary while remaining within the scope of the present disclosure. One skilled in the art will also recognize that the disclosed embodiments are not limited to implementations using the 3GPP or ETSI M2M architectures discussed above, but rather may be implemented in other architectures and systems, such as oneM2M, MQ Telemetry Transport (MQTT), and other related M2M systems and architectures.

One process that is often performed in an M2M system is called bootstrapping. Bootstrapping is a process by which entities (e.g., an end-user device and server) perform mutual authentication and key agreement to establish a relationship enabling secure communications between them. Mutual authentication is a procedure in which each party proves its identity to the other. Authentication helps prevent a rogue device from registering with a server by pretending it is a legitimate end-user device. Authentication also helps prevent a fraudulent server from performing a man-in-the-middle attack, which may consist of the fraudulent server establishing a connection with an end-user device by pretending that it is a legitimate server.

Key agreement is a procedure in which the communicating entities derive a security key that they can then use to secure communications between them, for example, by an encryption process that uses the security key. A feature of a key agreement mechanism is that the key is not transmitted. The key derivation function may be based on a shared secret value that is meant for only an end-user device and server to know, for example. This shared secret is also not transmitted. The key derivation function is designed such that it is prohibitively computationally complex for an eavesdropper, who does not know the shared secret, to compute the key by observing the messages that are transmitted during the key agreement procedure. An overview of some authentication and key agreement mechanisms is discussed herein. An overview of some authentication and key agreement mechanisms, such as Extensible Authentication Protocol (EAP) and Protocol for Carrying Authentication for Network Access (PANA), are discussed below to give further context to disclosed embodiments.

Extensible authentication protocol (EAP) is not an authentication method in itself, but rather a common authentication framework that can be used to implement specific authentication methods. In other words, EAP is a protocol that allows the Peer, Authenticator, and Authentication Server to negotiate what authentication method will be used. The selected authentication method is then run inside of the EAP protocol. EAP is defined in RFC 3748. RFC 3748 describes the EAP packet format, procedures, as well as basic functions such as negotiation of the desired authentication mechanism.

FIG. 4 illustrates the basic EAP architecture. As shown in FIG. 4, and described in RFC 3748, there is an EAP peer 161, which may contact an authentication server 162 via an EAP authenticator 163 (e.g., access point). EAP can use the Radius or Diameter protocols. There are many EAP methods defined by IETF. Discussed herein is an EAP method called EAP-authentication and key agreement (AKA) which is based on universal mobile telecommunications system (UMTS)-AKA and defined in RFC 4187. Yet, many of the ideas that are presented herein can be used regardless of the selected EAP authentication method. EAP was designed as a link layer (Layer 2) protocol. PANA is a protocol that may be used to carry EAP messages over an IP network. In other words, PANA is a transport for EAP. PANA runs on top of the network (IP) layer. PANA is defined in RFC5191. PANA allows dynamic service provider selection, supports various authentication methods, is suitable for roaming users, and is independent from link layer mechanisms.

SUMMARY

Bootstrapping can be an expensive process in that it often requires that secret keys or certificates be provisioned in a device in order to achieve the desired level of security. This is a particularly important problem in the machine-to-machine field because of the large number of devices that are required to bootstrap with an SCS, or M2M server. Disclosed herein are methods, devices, and systems for at least two bootstrapping approaches. In an embodiment, the service layer may leverage the access network infrastructure so that D/GSCL's may bootstrap with an M2M server without requiring provisioning beyond what is already required by the access network. In this approach, MTC-IWF may provide a secure connection to an AAA server of the access network. The service layer key material may be provided to the M2M server by the access network's AAA server when a UE attaches to the access network. In another embodiment, procedures are defined so that a M2M server uses the infrastructure of the core network to authenticate and authorize a device. For example, an EAP-PANA based approach may use an HSS as an EAP authentication server so that a UE and a M2M server can perform EAP-AKA-PANA authentication.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
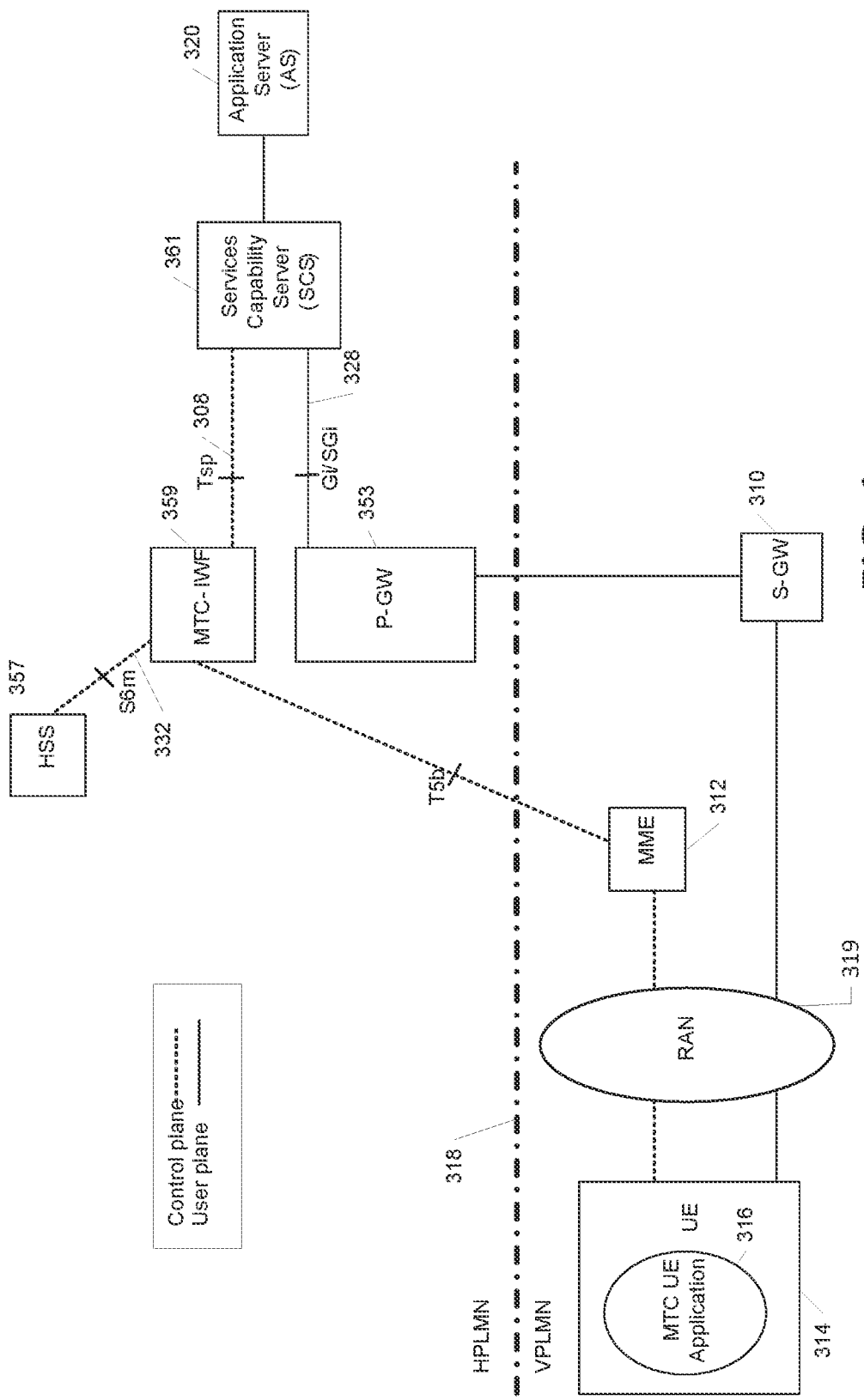
FIG. 1 is a block diagram illustrating the 3GPP Machine Type Communication (MTC) architecture.
Figure 2:
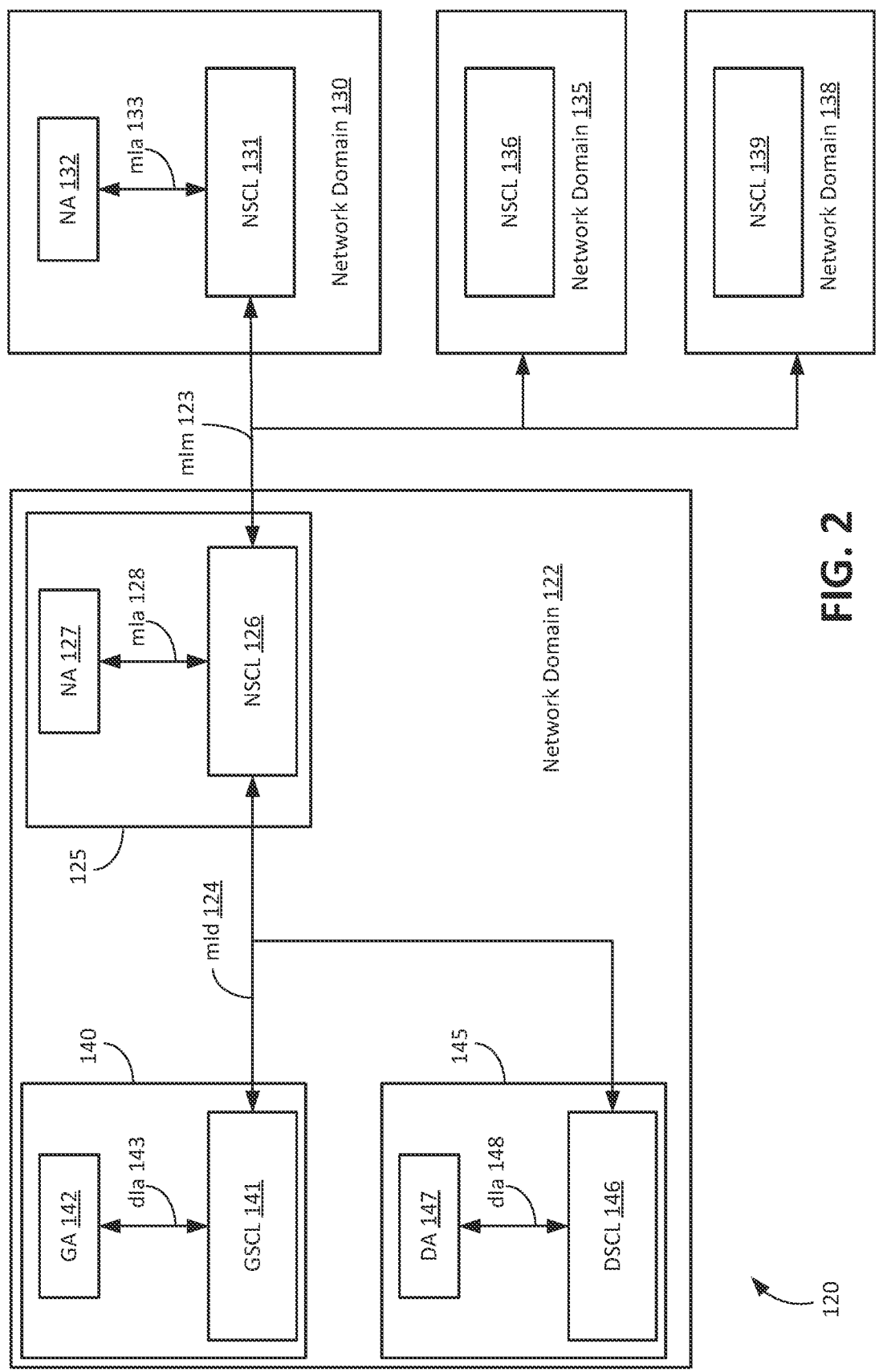
FIG. 2 is a block diagram illustrating the ETSI M2M architecture.

Before proceeding, it should be noted that embodiments described herein may be described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described.

In a RESTful architecture, representations of uniquely addressable resources are transferred between entities. The ETSI M2M specification (e.g., TS 102 921 and TS 102 690 as discussed herein) has standardized the resource structure that resides on an SCL. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the ETSI M2M architecture that is described herein to describe exemplary embodiments. The disclosed embodiments may be implemented in other architectures and systems as well, such as oneM2M and other M2M systems and architectures.

The EAP-PANA approach and EAP access network based approach discussed herein may allow the service layer to be more lightweight. In the EAP-PANA and the EAP access network based approaches, an interface is provided from an NSCL of a M2M server to the access network, but this interface is not completely defined by the ETSI M2M specifications. The ETSI M2M specifications, including section 8.3.2 of the ETSI M2M architecture specification and section 6.2 of the ETMS M2M mIa, dIa, mId specification, provide support for access network assisted bootstrapping methods, as discussed herein. Key agreement examples disclosed herein include a D/GSCL and M2M server deriving an M2M service layer root key (kmr).

Bootstrapping approaches disclosed herein are similar to the access network assisted M2M bootstrap procedures that are outlined in section 8.3.2 of the ETSI M2M architecture specification, ETSI TS 102 690, and ETSI TS 102 921. As discussed in further detail below, the ETSI M2M architecture is used as a baseline and is extended to make the processes more efficient and to better exploit the capabilities of the access network. The access network may generally be considered the part of a telecommunications network which connects subscribers to their immediate application service provider.

Each bootstrapping method disclosed herein may (i) leverage the core network infrastructure to allow a D/GSCL of a UE (hereinafter UE D/GSCL) to perform mutual authentication with an NSCL of an M2M server (hereinafter M2M server); (ii) leverage the core network infrastructure (e.g., home public land mobile network) to derive the service layer root key, Kmr, as part of the bootstrapping process; and (iii) integrate the registration process, so when the bootstrapping process is complete, the UE D/GSCL will be registered with the M2M server.

One of the bootstrapping approaches disclosed herein is an EAP-PANA based approach. In summary, an EAP-PANA based approach may use a home subscriber server (HSS) as an EAP authentication server (e.g., authentication server 162) so that a UE D/GSCL and a M2M server can perform EAP-AKA-PANA authentication. In this approach, the UE D/GSCL is considered the EAP Peer (e.g., EAP peer 161) and the M2M server is considered the EAP Authenticator (e.g., EAP Authenticator 163). The M2M server contacts the EAP authentication server (e.g., HSS) via the machine type communication inter-working function (MTC-IWF).

Figure 4:
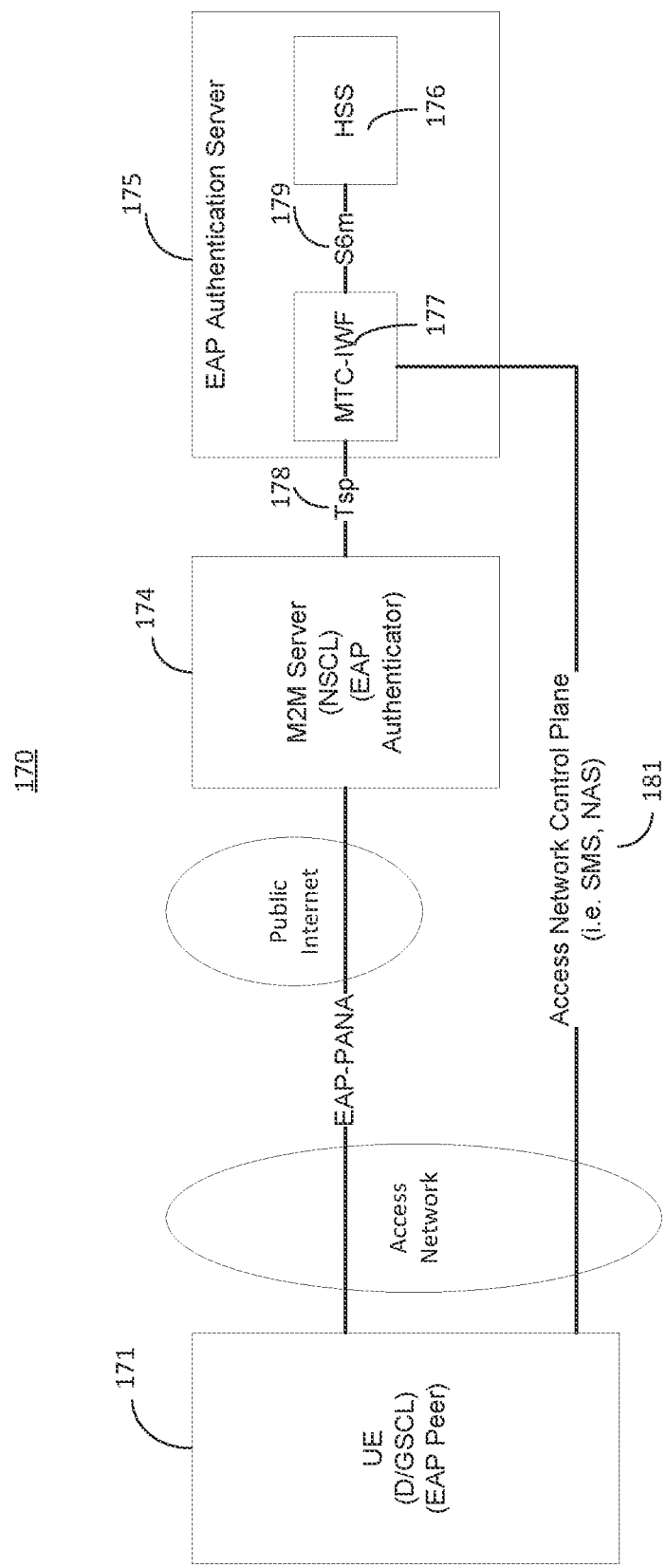
FIG. 4 illustrates an EAP-PANA-AKA architecture for M2M.

FIG. 4 displays an EAP-PANA-AKA architecture 170 for interworking with a cellular access network (EAP-PANA approach). UE D/GSCL 171 is communicatively connected with M2M server 174 using EAP-PANA. M2M server 174 is communicatively connected to EAP authentication server 175 via Tsp reference point 178. EAP authentication server 175 includes MTC-IWF 177 and HSS 176, which are connected via S6m reference point 179. EAP authentication sever 175 is communicatively connected to UE 171 via access network control plane 181, such as a non-access-stratum (NAS) and short messaging service (SMS). In this architecture, UE D/GSCL 171 is the EAP peer, M2M server 174 is the EAP authenticator, and MTC-IWF 177 together with HSS 176 is considered to be integrated within EAP authentication server 175.

MTC-IWF 177 hides the core network topology from M2M Server 174. Thus, EAP authentication server 175 may include an entity other than HSS 176, such as an authentication, authorization, and accounting (AAA) server (not shown). In ETSI terminology, MTC-IWF 177 is M2M authentication server (MAS) or an interface to the MAS. The M2M service bootstrap function (MSBF) is part of M2M server 174.

With reference to the EAP-PANA based architecture as shown in FIG. 4, if AKA is used, HSS 176 is used as the authentication server because the authentication key, Ki, is provisioned in the universal integrated circuit card (UICC) (not shown) and HSS 176. If an authentication key is stored in some other medium on UE D/GSCL 171 and provisioned in another network node such as an AAA server, then the same architecture applies.

Figure 5:
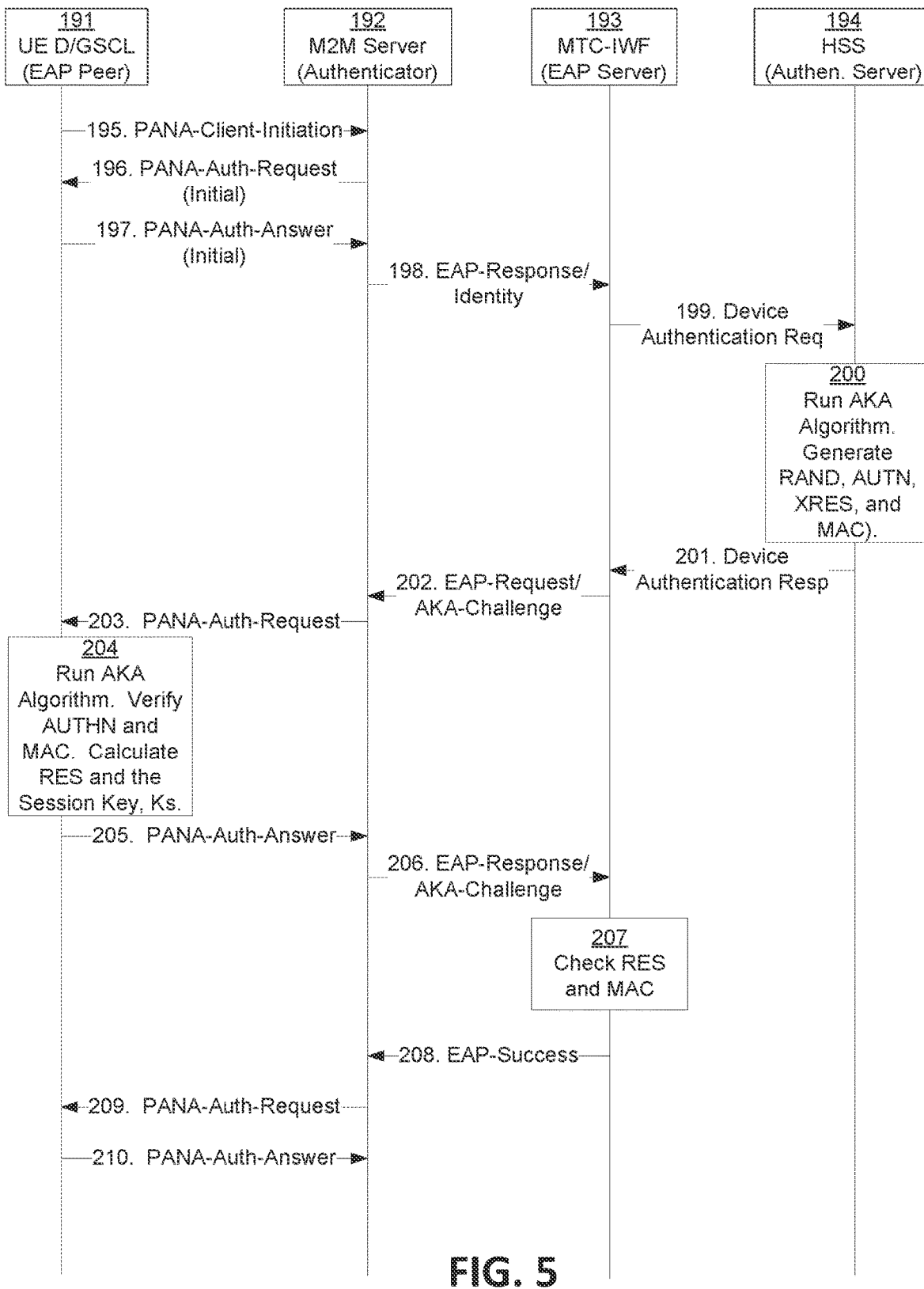
FIG. 5 illustrates a flow diagram of EAP-PANA D/GSCL bootstrapping.

A call flow of the EAP-PANA-AKA bootstrapping procedure is illustrated in FIG. 5 and discussed below. FIG. 5 illustrates flow 190 of UE D/GSCL 191 bootstrapping and registering with M2M server 192 using EAP-PANA-AKA. At step 195, a PANA-Client-Initiation (PCI) message is sent by UE D/GSCL 191 to M2M server 192. PCI message is defined in the PANA specification, IETF RFC 5191. The PCI message sent at step 195 is a registration request. The destination IP Address of the PCI message is the IP address of M2M server 192 and the destination port number may be a PANA port number (e.g., port 716). M2M server 192 uses the source IP Address and port number of the message to determine the IP Address and the port number that UE D/GSCL 191 listens on for PANA messages. In an embodiment, if M2M server 192 knows the IP address of UE D/GSCL 191 and it knows the port number that it listens on for PANA messages, then M2M server 192 can initiate bootstrapping. For example, this might be desired if M2M server 192 discovers some services that it requires on UE 191. PANA specification defines no attribute value pairs (AVPs) in the PCI message. However, the ETSI Specification, ETSI TS 102 921, defines AVPs which may be used for the PCI message. Table 1 displays examples of some of the AVPs that may be used. MSM-MSBF-ID, M2M-NSCL-ID, M2M-D/GSCL-ID, and M2M-SP-ID are optional AVPs that are used if the D/GSCL wants to limit the target registration to certain MSBF's, NSCL's, or service providers.

TABLE 1

AVPs for PCI message

| AVP | Description |
| --- | --- |
| M2M-Usage-Type | When bootstrapping it may be set to "M2M Bootstrapping." |
| M2M-Node-ID | M2M-Node-ID carries a device identifier. 3GPP capable devices can set this value to their M2M-Node-ID external identifier. |
| MSM-MSBF-ID | MSM-MSBF-ID carries the M2M Service Bootstrap Function (MSBF) identifier. The MSM-MSBF-ID AVP informs an NSCL of the identity of the authentication server. This field is not needed when 3GPP devices bootstrap. In 3GPP devices, the authentication server is the MTC-IWF/HSS. The MTC-IWF identity will be derived via a domain name service (DNS) lookup on the M2M-Node-ID. |
| M2M-NSCL-ID | M2M-NSCL-ID identifies the NSCL. |

TABLE 1-continued

AVPs for PCI message

| AVP | Description |
| --- | --- |
| M2M-D/GSCL-ID | M2M-D/GSCL-ID identifies the D/GSCL. M2M-D/GSCL-ID is the requested D/GSCL identifier. |
| M2M SP-ID | M2M_SP-ID identifies the service provider. |

At step 196, a PANA-Auth-Request (PAR) message is sent to UE D/GSCL 191. A PANA-Auth-Request (PAR) message is defined in IETF RFC 5191 (the PANA specification). When M2M server 192 does not know the IP address of UE D/GSCL 191, then the PAR message may be broadcast, multicast, or anycast to an address that UE D/GSCL 191 is reachable. At step 197, a PANA-Auth-Answer (PAN) message, which is defined in the PANA specification, is sent to M2M server 192. The PAN message has the M2M-Usage-Type AVP set to "M2M Bootstrapping."

At step 198, M2M server 192 makes a device authentication request to MTC-IWF 193. The device authentication request includes the 3GPP external device identifier of the device. For this instance, the Device-Information-Request (DIR) command, discussed in more detail herein, may be the command executed. The DIR command may include the EAP_Payload AVP, which carries the EAP-Response/AKA-Identity message that is defined in IETF RFC 4187 (the EAP-AKA specification). EAP payload is equal to an EAP-Response message or an AKA-Identity message. The DIR command may also include External ID, M2M server ID (SCS ID), and Requested Param, all of which are EAP AKA key material (EAP_AKA_KEY_MATERIAL).

At step 199, MTC-IWF 193 sends the device authentication request associated with step 198 to HSS 194. After receiving the device authentication request, HSS 194, at step 200, runs the AKA algorithm to generate an authentication token (AUTN), a random challenge (RAND), an expected authentication response (XRES), message authentication code (MAC), and a M2M Root Key. At step 201, HSS 194 sends MTC-IWF 193 the EAP-AKA bootstrapping information. The Device-Information-Answer (DIA) command, discussed in more detail herein, may be the command executed. The DIA command may include External ID, M2M server ID, and Requested Param, all of which are EAP AKA key material (EAP_AKA_KEY_MATERIAL). The DIA command may also include key-material, which is equal to RAND, XRES, AUTN, MAC, and M2M Root Key.

At step 202, MTC-IWF 193 sends EAP-AKA bootstrapping information to M2M server 192. The DIA command may include the EAP_Payload AVP. As discussed, EAP_Payload AVP carries the EAP-Request/AKA-Challenge message, which is defined in the EAP-AKA specification. The message at step 202 carries the random challenge (AT_RAND), AUTN, and MAC. MTC-IWF 193 retains XRES and the M2M Root Key (Kmr). XRES is not passed to M2M server 192.

At step 203, UE D/GSCL 191 receives the PAR message. The EAP_Payload of this PAR message carries the EAP-Request/AKA-Challenge message from step 202. At step 204, UE D/GSCL 191 runs the AKA algorithm and generates a response (RES) to the random challenge (RAND) and it uses AUTN to authenticate M2M server 192. UE D/GSCL 191 also derives the M2M root key, Kmr, as defined by ETSI TS 102 921. At step 205, M2M server 192 receives a PAN message that carries the EAP-Response/AKA-Challenge message which is defined in the EAP-AKA specification. At step 206, M2M server 192 makes another device authentication request to MTC-IWF 193 to check that the RES from UE D/GSCL 191 is correct. The request at step 206 includes the 3GPP External Device Identifier of UE D/GSCL 191. At step 206, the DIR command may be sent and include the External ID, M2M server ID, EAP_Payload, and Requested Param AVP's. The Requested Param may be set to EAP_AKA_KEY_MATERIAL, which includes External ID, M2M server ID, and Requested Param. The EAP_Payload AVP may be equal to the EAP Response message or AKA challenge message.

After MTC-IWF 193 receives the request of step 206, MTC-IWF 193, at step 207, compares the RES against the XRES. At step 208, M2M server 192 receives a response that includes EAP_AKA_KEY_MATERIAL (=External ID, SCS ID, and Requested Param) and EAP_Payload (=EAP-Success or EAP-Failure, Key-Material which is Kmr). The EAP-Success message and EAP-Failure message are defined in the EAP specification, IETF RFC 3748. At step 208, it is assumed that an EAP success message is received.

At step 209, UE D/GSCL 191 receives a PAR message that carries the EAP-Success message (or EAP-Failure message) associated with step 208. The PAR message of step 209 may include additional information, such as M2M-Bootstrap-Result, M2M-Node-ID (carries the service provider assigned Node-ID), M2M-D/GSCL-ID, and M2M-NSCL-ID. At step 210, the PAN message carries information (e.g., a set complete, or "C", bit) indicating that bootstrapping and registering with M2M server 192 using the EAP-AKA protocol over PANA is successful.

A second bootstrapping approach will now be described. This second approach leverages EAP based access network registration for service layer bootstrapping and registration (hereinafter EAP access network based approach). In summary, an EAP access network based approach may be used in cases where a UE D/GSCL uses EAP methods to authenticate with the access network. In this approach, MTC-IWF provides a secure connection to the access network authentication server. The service layer key material may be provided to the M2M server by the AAA Server of the access network when the UE D/GSCL attaches to the access network. By using this approach to exchange security keys, the need for the M2M server and UE D/GSCL to negotiate security keys over an interface that is not yet secure is avoided. This approach may streamline the process of connecting a device to an M2M server.

Figure 6:
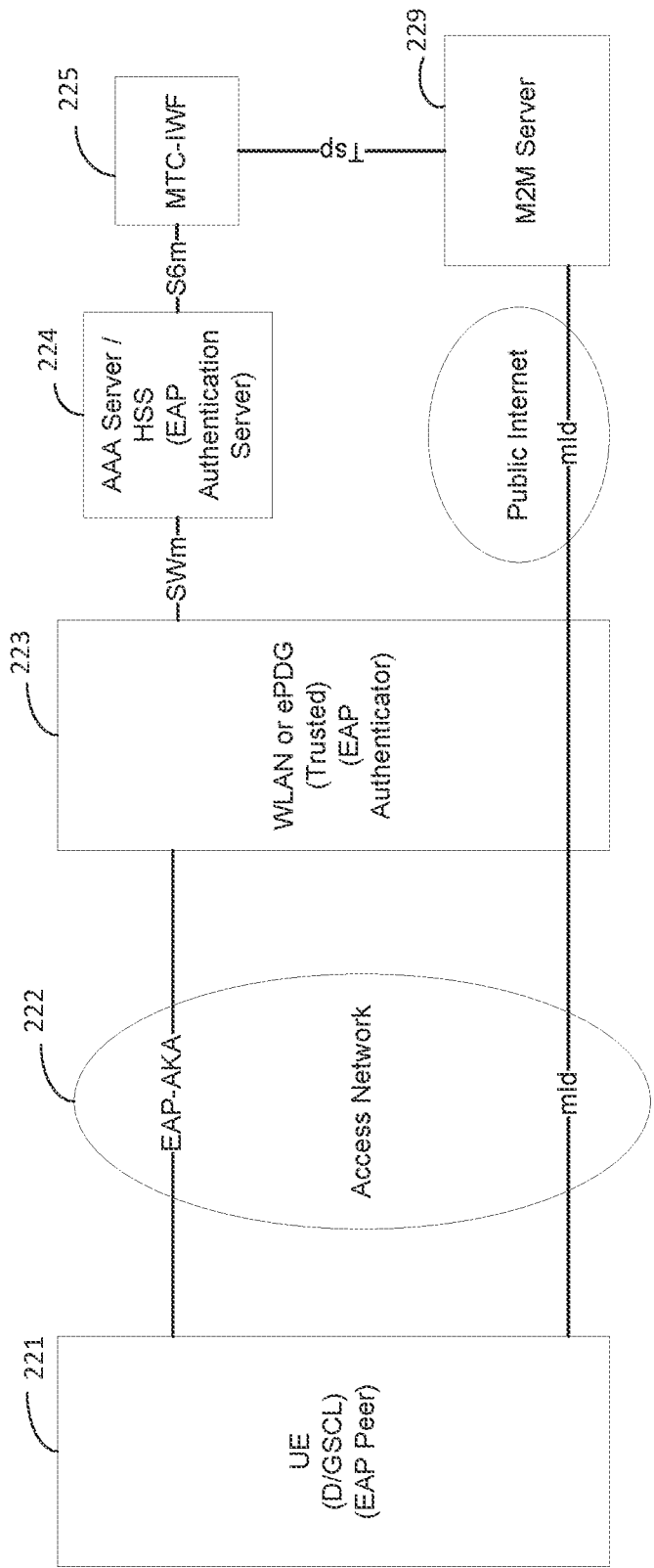
FIG. 6 illustrates an EAP access network-based service layer bootstrapping for M2M.

Authorization and authentication via a trusted wireless local area network (WLAN) is defined in 3GPP TS 33.402. FIG. 6 illustrates an architecture for leveraging EAP based access network registration for service layer bootstrapping and registration, in accordance with the present embodiment. The service layer root keys are generated by AAA Server/HSS 224 when the keys with regard to access network 222 are generated. MTC-IWF 225 will be used to pass the key material to M2M server 229. A call flow is shown in FIG. 7A and FIG. 7B, which is discussed in more detail below.

Figure 3:
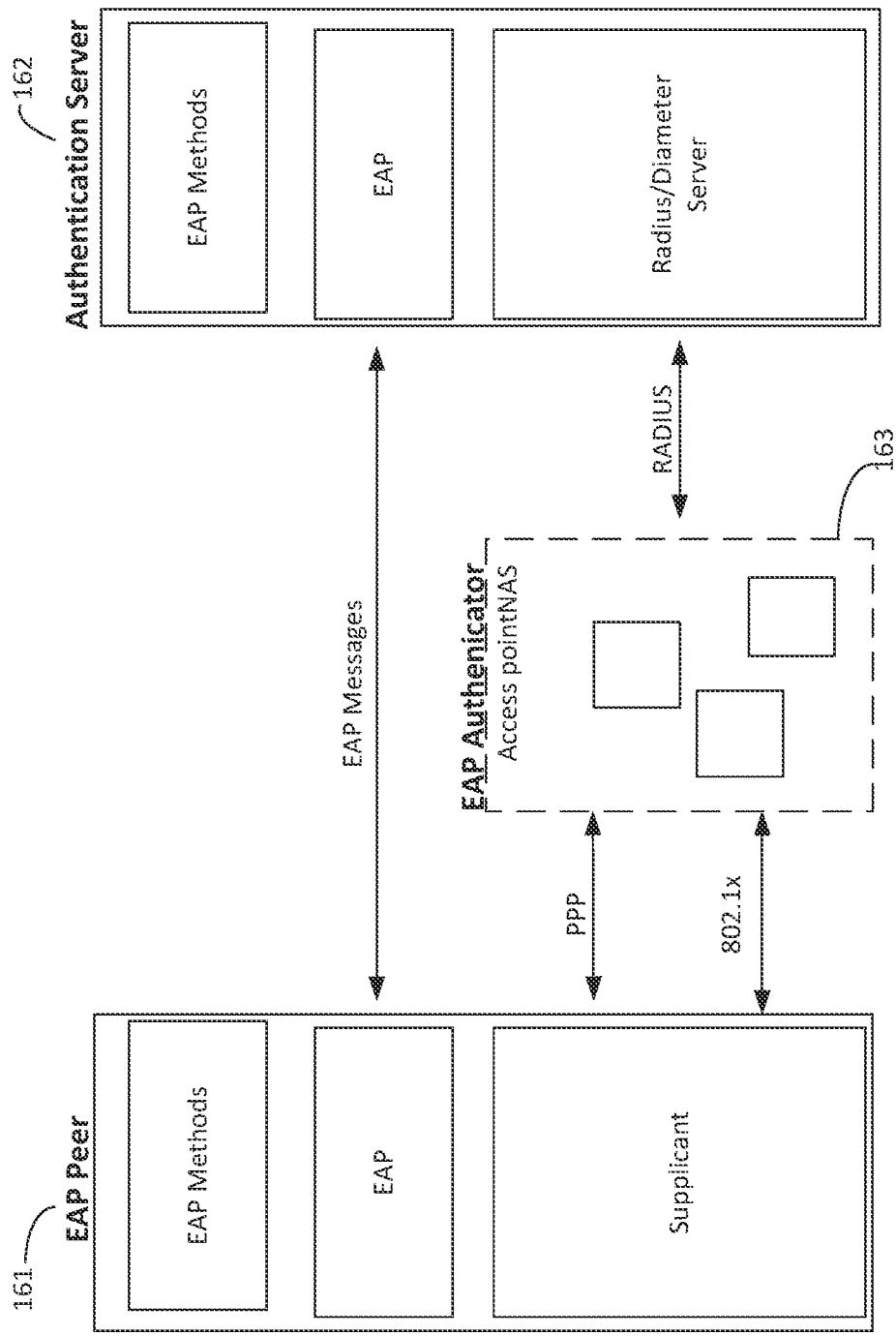
FIG. 3 illustrates a generic EAP architecture.

When EAP, or similar, authentication methods are used to bootstrap D/GSCLs with the access network, the M2M Server's service layer may leverage the process to bootstrap with the device. Some access networks use EAP methods for access network registration. For example, with reference to FIG. 6, when UE D/GSCL 221 connects with the evolved packet system (EPS) via trusted WLAN 223, UE D/GSCL 221 authenticates with the core network using EAP-AKA'. AKA' (AKA-prime) is defined in RFC 5488. AKA' is a variant of AKA where the derived keys (i.e., the M2M root key) are based on the access network name. For the EAP access network based approach, the EAP actors in FIG. 3 would be mapped as follows to the actors as shown in FIG. 6, respectively. EAP peer 161 may be mapped with UE D/GSCL 221, EAP authenticator 163 may be mapped with WLAN access point 223, and authentication server 162 may be mapped to HSS 224.

Figure 7A:
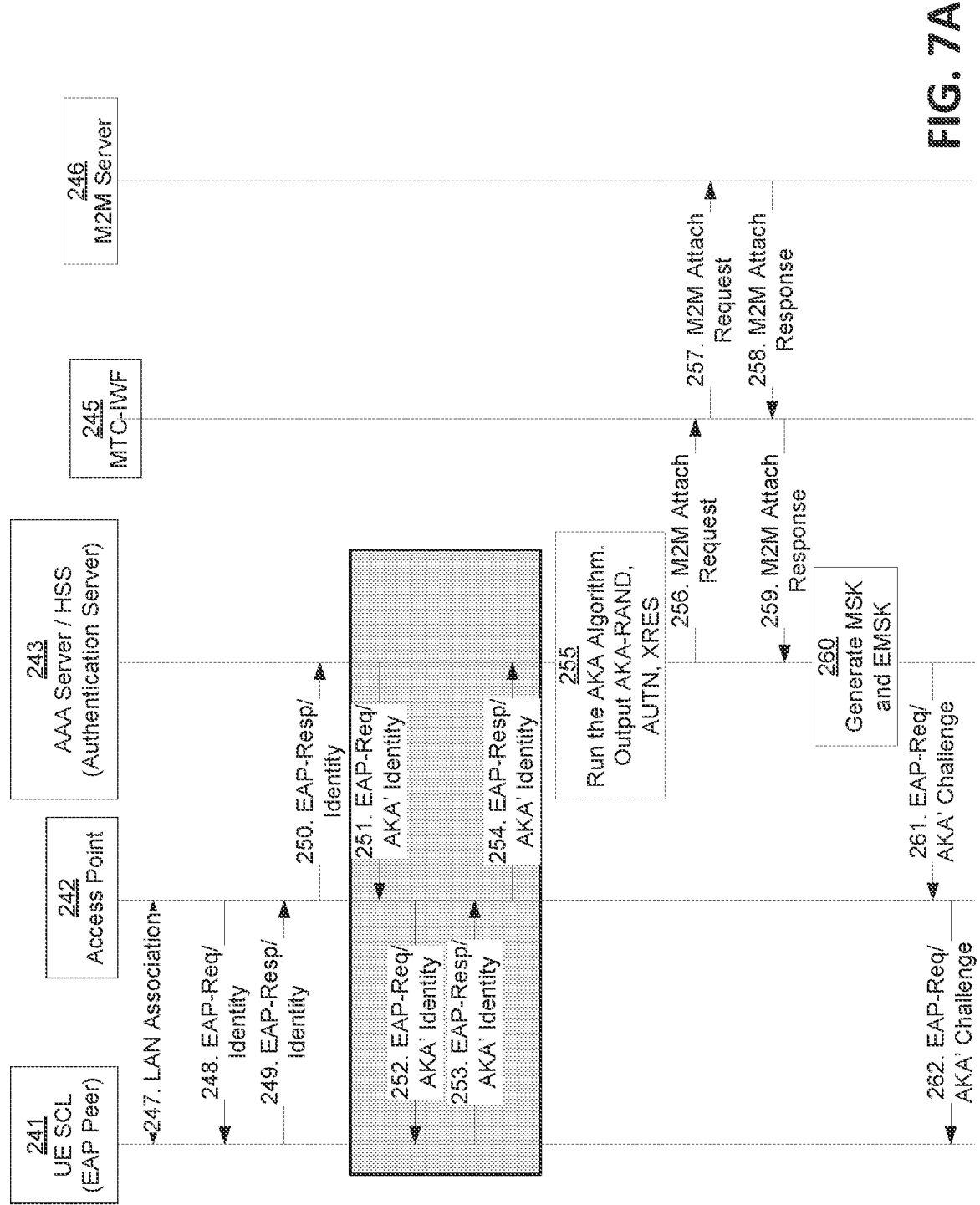
FIG. 7A illustrates a flow diagram of access network EAP based D/GSCL bootstrapping.
Figure 7B:
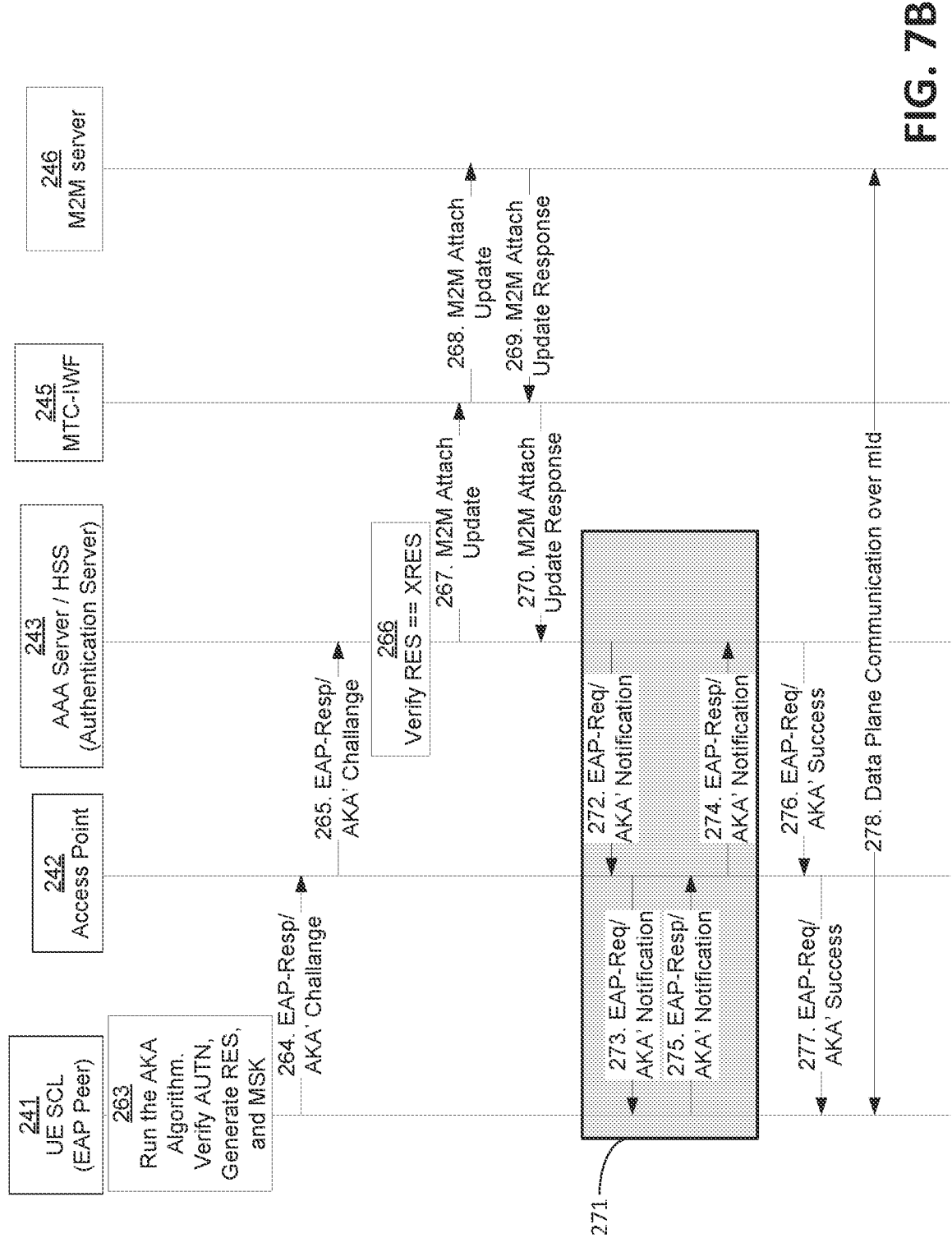
FIG. 7B illustrates a flow diagram of access network EAP based D/GSCL bootstrapping continued from FIG. 7A.

FIG. 7A through FIG. 7B are based on FIGS. 6.2-1 of 3GPP TS 33.402. FIGS. 6.2-1 of 3GPP TS 33.402 shows how a UE authenticates and performs key agreement with the 3GPP access network when connecting via a trusted non-3GPP access point. FIG. 7A through FIG. 7B, along with the discussion below, show how the process can be extended so that UE D/GSCL 221 can simultaneously bootstrap, perform key agreement, and register with M2M server 229.

The message descriptions below show how the call flow is extended to support service layer bootstrapping. Refer to FIGS. 6.2-1 of 3GPP TS 33.402 for a more detailed description of the existing steps. Note that although FIG. 7A through FIG. 7B are based on a UE D/GSCL authenticating via a trusted non-3GPP network (e.g., includes a diameter Connection—SWm), the enhancements for service layer bootstrapping can be applied to any access network that allows a device to authenticate via EAP based methods or other similar means.

With reference to FIG. 7A, at step 247, UE D/GSCL 241 connects with access point 242, which is a trusted non-3GPP access point. At step 248, access point 242 requests the identity of UE D/GSCL 241. At step 249, UE D/GSCL 241 sends an EAP response to the identity request of step 248. The identity of the UE D/GSCL 241 may be its network access identity (NM). The response of step 249 may also include AVPs that carry parameters that include an access network public ID (e.g., 3GPP external identifier), service provider identifier, or application ID of an application on UE D/GSCL 241. A service provider identifier may be the name of a company who provides service layers that the device wants to connect with or it may name a specific service layer (e.g., an NSCL ID) that the device wants to connect with. Application ID (e.g., D/GSCL ID for 3GPP; the DA or NA for onM2M) may be the name that the requesting application (GA, DA, DSCL, or GSCL) is requesting that it be assigned.

At step 250, access point 242 sends the information from step 249 to the access network AAA Server 243, which also may be an HSS. Step 251 through step 254 generally is done when AKA' is used, particularly if the nodes between UE D/GSCL 241 and AAA server 243 have changed the user identity in the original EAP identity response message of step 249. At step 251, AAA server 243 requests the AKA' identity of UE D/GSCL 241. At step 252, the request of step 251 is sent to UE D/GSCL 241. At step 253, UE D/GSCL 241 responds with its identity (similar to step 249). At step 254, access point 242 sends the information from step 253 to access network AAA Server 243.

At step 255, based on subscriber information from the HSS, AAA server 243 verifies that UE D/GSCL 241 is permitted to access the EPC and verifies that UE D/GSCL 241 is permitted to register with M2M server 246 that was named in the previous step. For further clarification, generally an HSS can be considered a database that holds subscriber information. Here AAA server 243 is a server that is allowed to access the HSS and make AAA decisions based on the information in the HSS. At step 256, if UE D/GSCL 241 is permitted to access the access network, then the AKA algorithm will be run. Also, if the "Attachment Block Enabled" flag is enabled or if the NSCL ID was provided in step 253, then AAA server 243 will send a message to the address of MTC-IWF 245, which is provided in the subscriber data. The Device-Permission-Request (DPR) Command, discussed in more detail herein, may be executed with Action-Type=Device Attach Request, External-ID, SCS-Identifier. The message at step 256 is sent over the S6m reference point. A purpose of this message is to see if UE D/GSCL 241 should be allowed to attach or if M2M server 246 wishes that the request to attach be rejected. If a name of UE D/GSCL 241 was provided in step 253, then this message is also used to propose the name of UE D/GSCL 241 to M2M server 246 so that UE D/GSCL 241 may be registered.

At step 257, MTC-IWF 245 sends a message to M2M server 246 to determine if UE D/GSCL 241 should be allowed to attach. This message is sent over the Tsp reference point. The DPR command may be executed with Action-Type=Device Attach Request, External-ID. At step 258, M2M server 246 responds with an indication of whether or not UE D/GSCL 241 should be allowed to attach. If M2M server 246 indicates that UE D/GSCL 241 should not be allowed to attach, M2M server 246 provides a cause to MTC-IWF 245 and M2M server 246 may provide a backoff time to MTC-IWF 245. If the name of UE D/GSCL 241 was provided (e.g., via the DPR at step 257), then the response from M2M server 246 includes the name of UE D/GSCL 241. If M2M server 246 accepts the proposed name, then the same name is provided back to the MTC-IWF. The Device-Permission-Answer (DPA) Command) may be executed for step 258.

At step 259, MTC-IWF 245 sends AAA server 243 an indication of whether or not the M2M server 246 desires that UE D/GSCL 241 be allowed to attach. If M2M server 246 indicates that UE D/GSCL 241 does not need to be attached at this time, MTC-IWF 245 provides the cause and a back-off time to AAA server 243. This message is sent over the S6m reference point, which may be executed using a DPA Command. At step 260, the EAP MSK and EMSK are generated. EAP MSK and EMSK are standard keys that fall out of the EAP algorithm. The service layer root key (Kmr) may be generated by the AAA server as described in section 8.3.2.3 of the ETSI M2M Architecture Specification, ETSI TS 102 690. Kmr is equal to the Hash of (EMSK, "ETSI M2M Device-Network Root Key"|M2M-Node-ID|M2M-SP-ID).

At step 261, AAA Server 243 sends the EAP-Request towards UE D/GSCL 241. If the EAP method is AKA', then this message includes the random challenge (RAND), network authentication vector (AUTN), and message authentication code (MAC). The identity response may include AVPs that carry parameters, such as the access network public ID, NSCL ID, or assigned application ID (e.g., D/GSCL ID). The access network public ID may be used as the M2M-Node_ID that is used to generate Kmr. The NSCL ID represents the specific service layer that the UE application (DA, GA, DSCL, or GSCL) should connect to, and it is the M2M-SP-ID that is used to generate Kmr. The assigned application ID represents the specific identifier that has been assigned to the application by the NSCL. This value may be used as the M2M-Node_ID that is used to generate Kmr. At step 262, access point 242 sends the message of step 261 to UE D/GSCL 241.

As shown in FIG. 7B, which is a continuation of the flow of FIG. 7A, at step 263, UE D/GSCL 241 runs the AKA algorithm, and verifies that AUTN is correct to authenticate the network. After the network is verified, UE D/GSCL 214 generates a response to the RES. The service layer root key (e.g., Kmr) may be generated by UE D/GSCL 241, as described in section 8.3.2.3 of the ETSI M2M architecture specification. Kmr is equal to the Hash of (EMSK, "ETSI M2M Device-Network Root Key"|M2M-Node-ID|M2M-SP-ID. At step 264, UE D/GSCL 241 sends a RES to the random challenge. At step 265, AAA server 243 receives the RES of step 264. At step 266, AAA server 243 verifies that the RES is equal to the XRES.

With further reference to FIG. 7B, at step 267, if the "Reachable Indicators Enabled," flag is enabled or if the NSCL ID was provided in step 253, then AAA server 243 sends a message to the address of MTC-IWF 245 that was provided in the subscriber data for UE D/GSCL 241. The Device-Notification-Request (DNR) command, as discussed in more detail herein, may be executed with Action-Type=Device Attach Event, External-ID, M2M-Identifier, Key-Material, UE Service Layer ID. The message at step 267 is sent over the S6m reference point and will ultimately inform M2M server 246 that UE D/GSCL 241 has attached.

At step 268, M2M server 246 receives the attach notification over the Tsp reference point. The DNR command may be executed with Action-Type=Device Attach Event, Key-Material, External-ID. At step 269, M2M server 246 acknowledges the received notification of step 268. The DNA command, discussed in more detail herein, may be executed at step 269. At step 270, MTC-IWF 245 sends the acknowledgement of step 269 to AAA server 243 over the S6m reference point.

Similar to step 251 through step 254, steps in block 271 are usually only done when AKA' is being used. At step 272, if AAA server 243 and UE D/GSCL 241 are using protected successful result indications, then AAA server 243 sends an EAP-Request/AKA'-Notification message to UE D/GSCL 241 prior to sending an EAP-Success message. At step 273, access point 242 sends the response of step 272 to UE D/GSCL 241. At step 275, UE D/GSCL 241 sends an EAP-Response/AKA'-Notification message, which is forwarded to AAA server 243 at step 274. At step, 276 AAA server 243 sends the EAP-Success message, which is forwarded to UE D/GSCL 241 at step 277. At step 278, UE D/GSCL 241 is registered, but the M2M server may not know the IP address of UE D/GSCL 241. UE D/GSCL 241 may begin communication over the mId or M2M server 246 can begin communication by sending a device trigger.

Since the access network assists with bootstrapping, additional information may be retained in the subscription information of devices that are allowed to use this feature. New access network subscription information is added to the HSS to support the authorization of service layer bootstrapping.

Figure 8A:
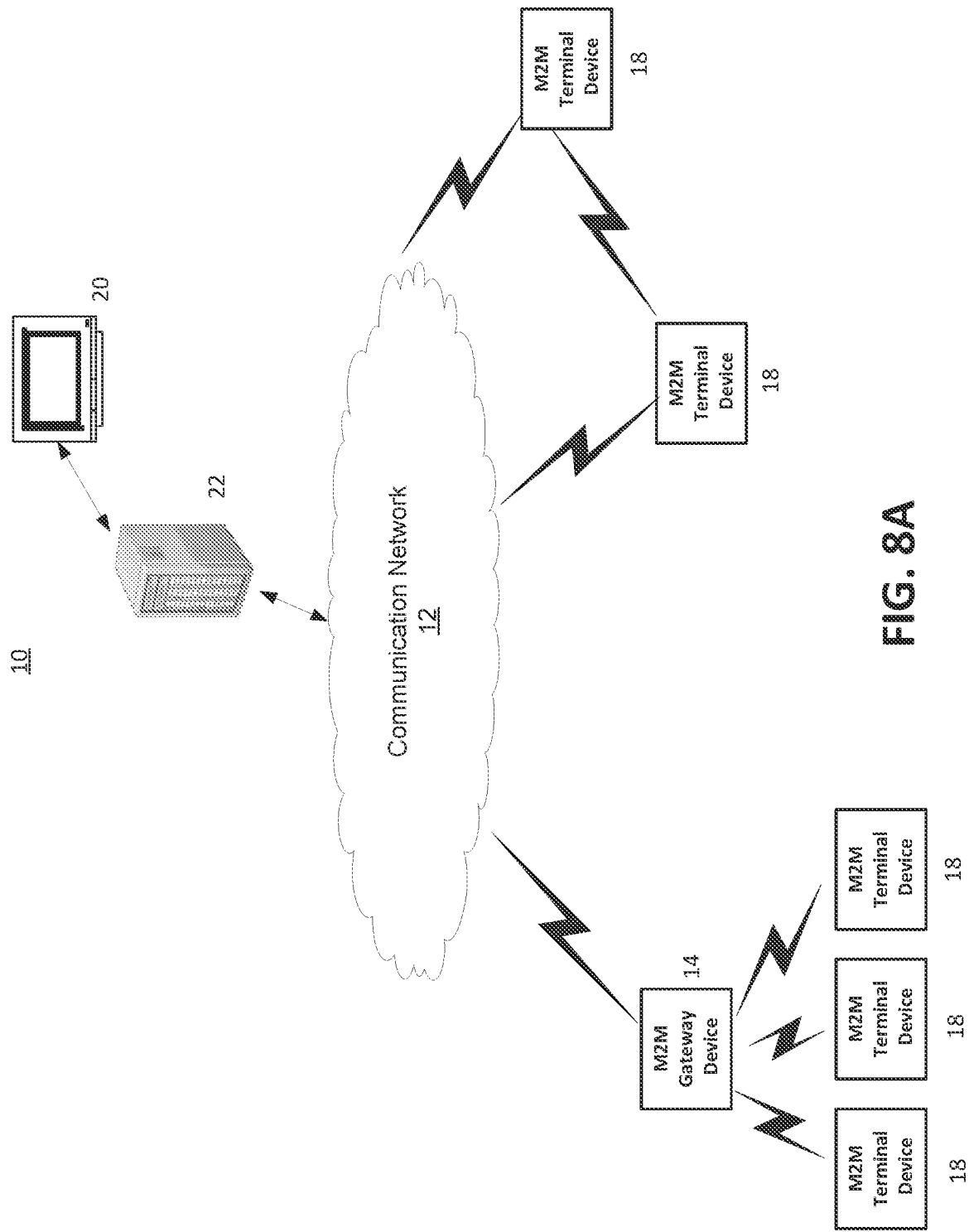
FIG. 8A is a system diagram of an example machine-to-machine (M2M) or Internet of Things (IoT) communication system in which one or more disclosed embodiments may be implemented.

FIG. 8A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc.

As shown in FIG. 8A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 8A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 8B:
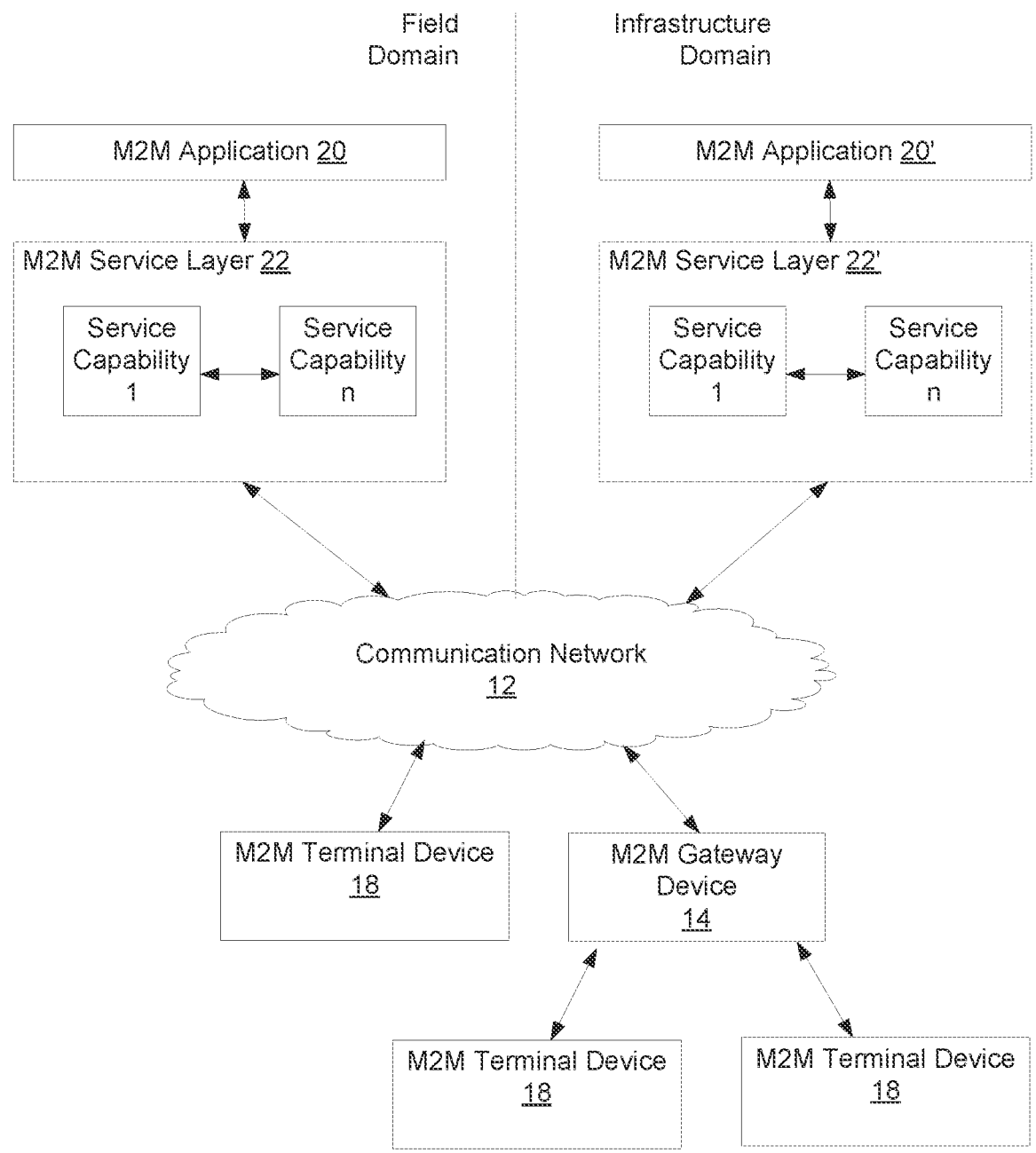
FIG. 8B is a system diagram of an example architecture that may be used within the M2M/IoT communications system illustrated in FIG. 8A.

Referring to FIG. 8B, the illustrated M2M service layer 22 (e.g. a network service capability layer (NSCL) as described herein) in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 8B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some embodiments, M2M applications 20 and 20' may include desired applications that communicate using EAP, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

EAP related approaches (e.g., EAP-PANA or EAP access network based approach) used in the present application may be implemented as part of a service layer. The service layer (e.g., UE D/GSCL 191) is a software middleware layer that supports value-added service capabilities through a set of Application Programming Interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain EAP related approaches of the present invention. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, EAP related approaches of the present application can implemented as part of an M2M network that uses a Service Oriented Architecture (SOA) and/or a resource-oriented architecture (ROA) to access services such as the EAP related approaches of the present application.

Figure 8C:
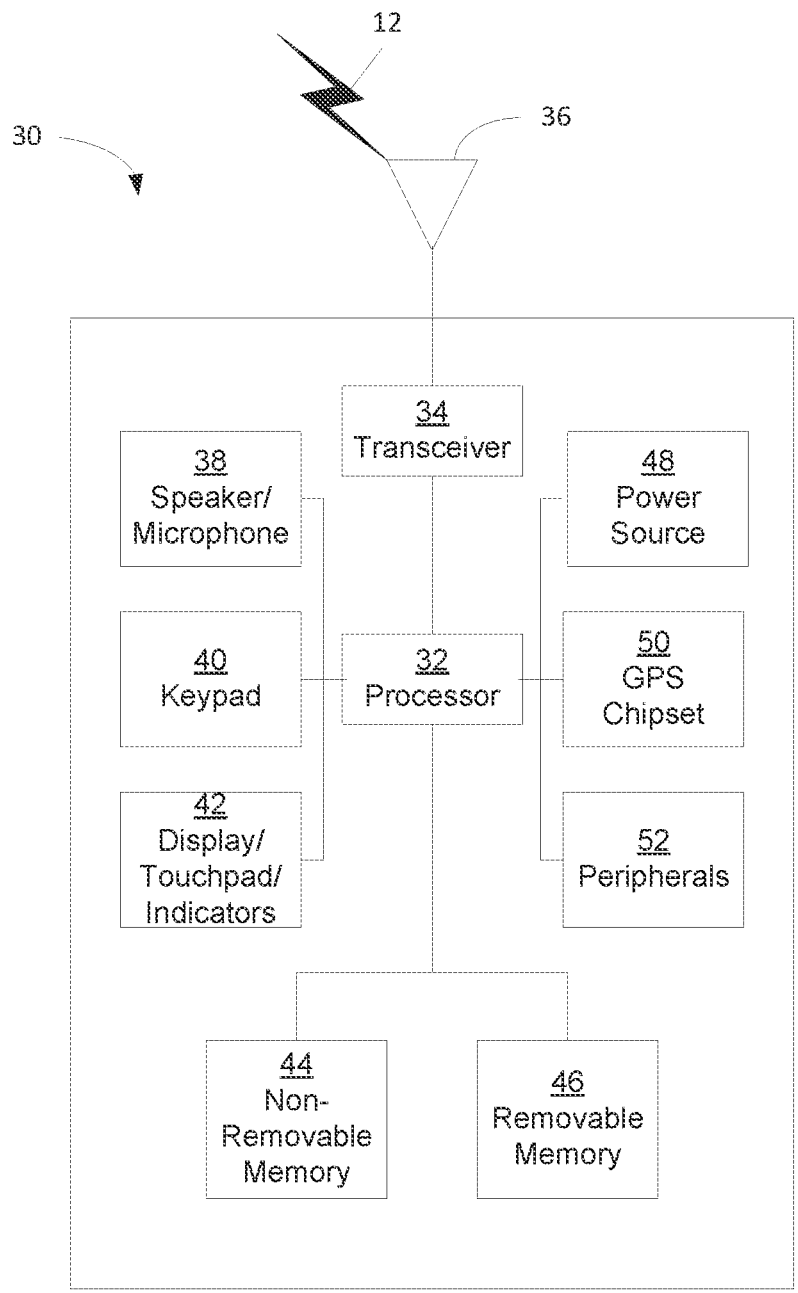
FIG. 8C is a system diagram of an example M2M/IoT terminal or gateway device that may be used within the communications system illustrated in FIG. 8A.

FIG. 8C is a system diagram of an example M2M device 30, such as an M2M terminal device 18 or an M2M gateway device 14 for example. As shown in FIG. 8C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with an embodiment. This device may be a device that uses the disclosed of systems and methods for bootstrapping using EAP-PANA.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 8C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 8C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to whether bootstrapping (e.g., bootstrapping using EAP) in some of embodiments described herein is successful or unsuccessful, or otherwise indicate the status of resource propagation processes. A user interface viewed via display 42 may give a user an option of using EAP-PANA, EAP access network based approach, GBA, or the like for authentication.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 8D:
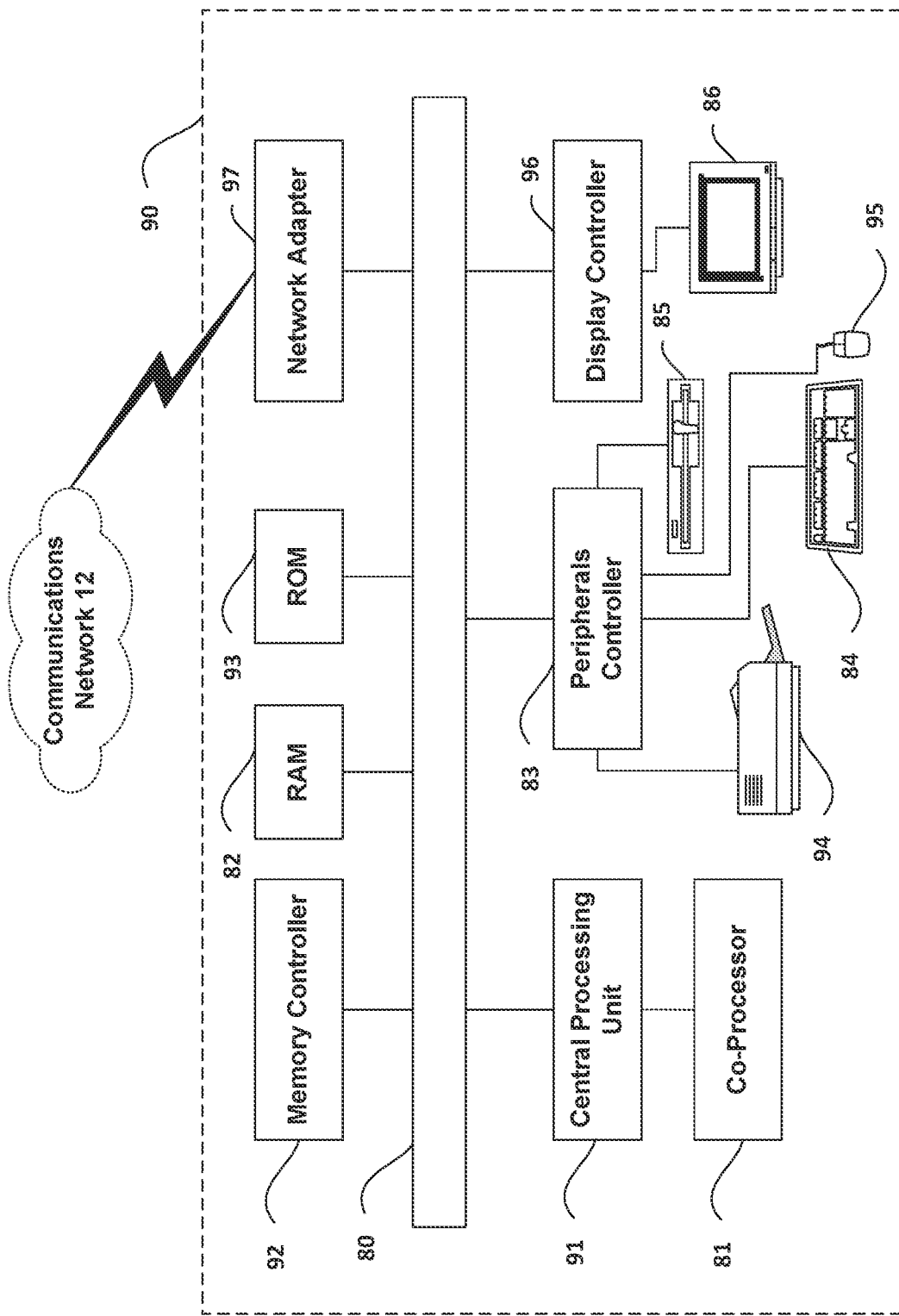
FIG. 8D is a block diagram of an example computing system in which aspects of the communication system of FIG. 8A may be embodied.

FIG. 8D is a block diagram of an exemplary computing system 90 on which, for example, the M2M service platform 22 of FIG. 8A and FIG. 8B may be implemented. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for EAP, such as exchanging device authentication messages.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 8A and FIG. 8B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A user equipment comprising:
    a processor; and
    a memory coupled with the processor, the memory having stored thereon executable instructions that when executed by the processor cause the processor to:
        receive a request for an identity associated with the user equipment and associated with a service provider identifier, wherein the service provider identifier is used to identify a service provider and used to identify a service to which the user equipment is attempting to connect with;
        in response to the request, transmit, to a network node, an Extensible Authentication Protocol (EAP) message and the service provider identifier, the EAP message comprising:
            a first identifier that is associated with the user equipment; and
        receive a response message to the EAP message, wherein the response message indicates that connection to the service of the service provider is permitted.

2. The user equipment of claim 1, wherein the request is received based on initiating a network registration procedure.

3. The user equipment of claim 1, wherein the network node is a 3GPP network node.

4. The user equipment of claim 1, wherein the EAP message further comprises an access network identifier of the user equipment.

5. The user equipment of claim 1, wherein the first identifier is an application identifier.

6. The user equipment of claim 1, wherein the service provider identifier is associated with a server.

7. The user equipment of claim 1, wherein the service provider identifier is associated with a server that is deployed outside of an operator domain and controlled by the service provider.

8. The user equipment of claim 1, wherein the service provider identifier is associated with a server that accesses functions of a core network through an exposed interface.

9. The user equipment of claim 1, wherein the service is associated with at least one network function.

10. A method comprising:
    receiving a request for an identity associated with a service provider identifier, wherein the service provider identifier is used to identify a service provider and used to identify a service to which a user equipment is attempting to connect with;
    in response to the request, transmitting, to a network node, an Extensible Authentication Protocol (EAP) message and the service provider identifier, the EAP message comprising:
        a first identifier that is associated with the user equipment; and receiving a response message to the EAP message, wherein the response message indicates that connection to the service is permitted.

11. The method of claim 10, wherein the request is received based on initiating a network registration procedure.

12. The method of claim 10, wherein the network node is a 3GPP network node.

13. The method of claim 10, wherein the first identifier is an application identifier.

14. The method of claim 10, wherein the service provider identifier is associated with a server that is deployed outside of an operator domain and controlled by the service provider.

15. The method of claim 10, wherein the service provider identifier is associated with a server that accesses functions of a core network through an exposed interface.

16. The method of claim 10, wherein the service is associated with at least one network function.

17. The method of claim 10, wherein the service is associated with at least one network function that is deployed inside of an operator domain and controlled by an operator.

18. An apparatus comprising:
a processor; and
a memory coupled with the processor, the memory having stored thereon executable instructions that when executed by the processor cause the processor to:
send a request for an identity associated with a service provider identifier, wherein the service provider identifier is used to identify a service provider and used to identify a service to which a user equipment is attempting to connect with;
in response to the request, receive an Extensible Authentication Protocol (EAP) message and the service provider identifier, the EAP message comprising:
a first identifier that is associated with the user equipment; and
transmit a response message associated with the EAP message, wherein the response message indicates that connection to the service of the service provider is permitted.

19. The apparatus of claim 18, wherein the request is sent based on initiating a network registration procedure.

* * * * *